July 30, 1935.  C. C. FARMER ET AL  2,009,840
FLUID PRESSURE BRAKE
Filed June 24, 1932  3 Sheets-Sheet 1
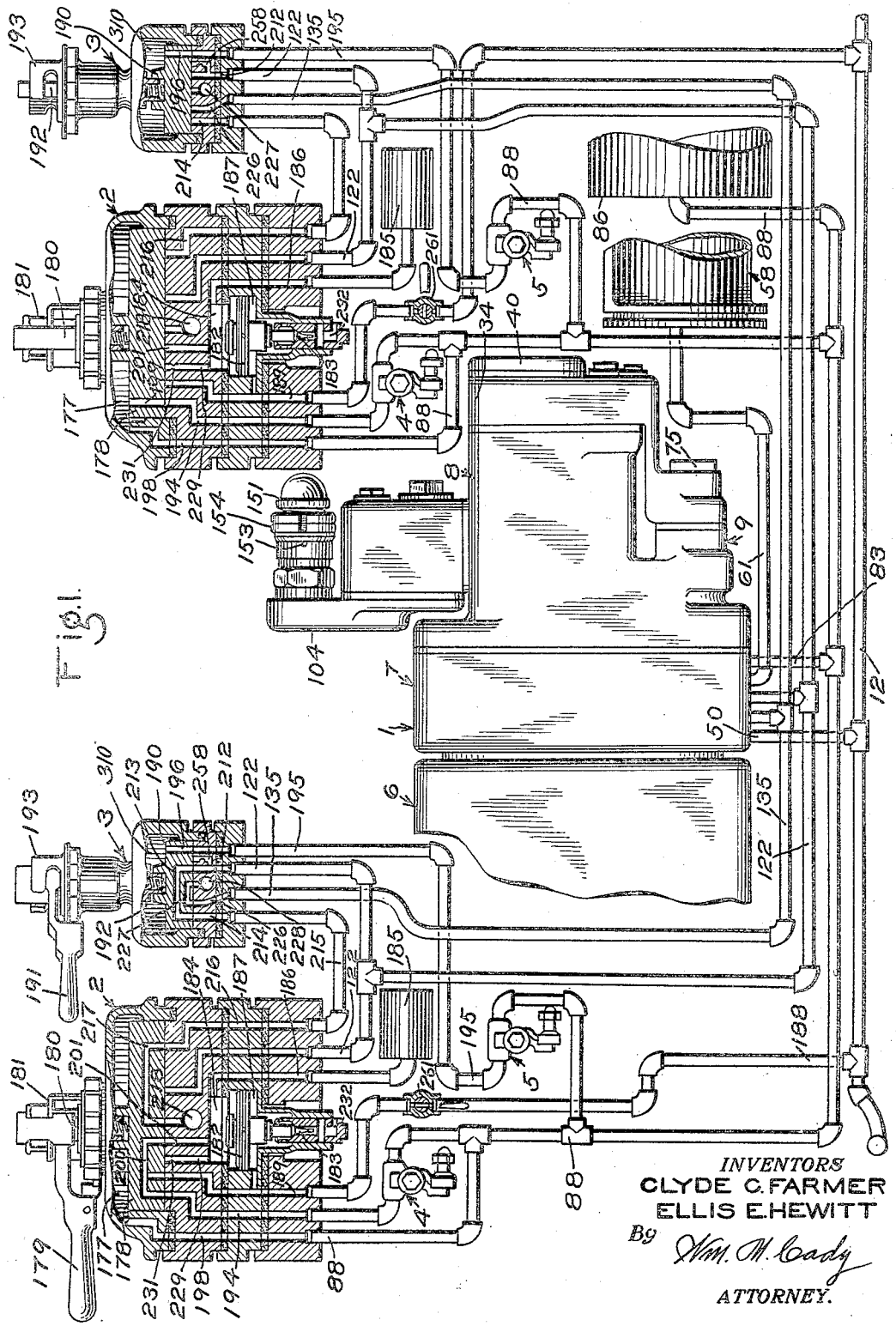
INVENTORS
CLYDE C. FARMER
ELLIS E. HEWITT
By Wm. M. Cady
ATTORNEY.

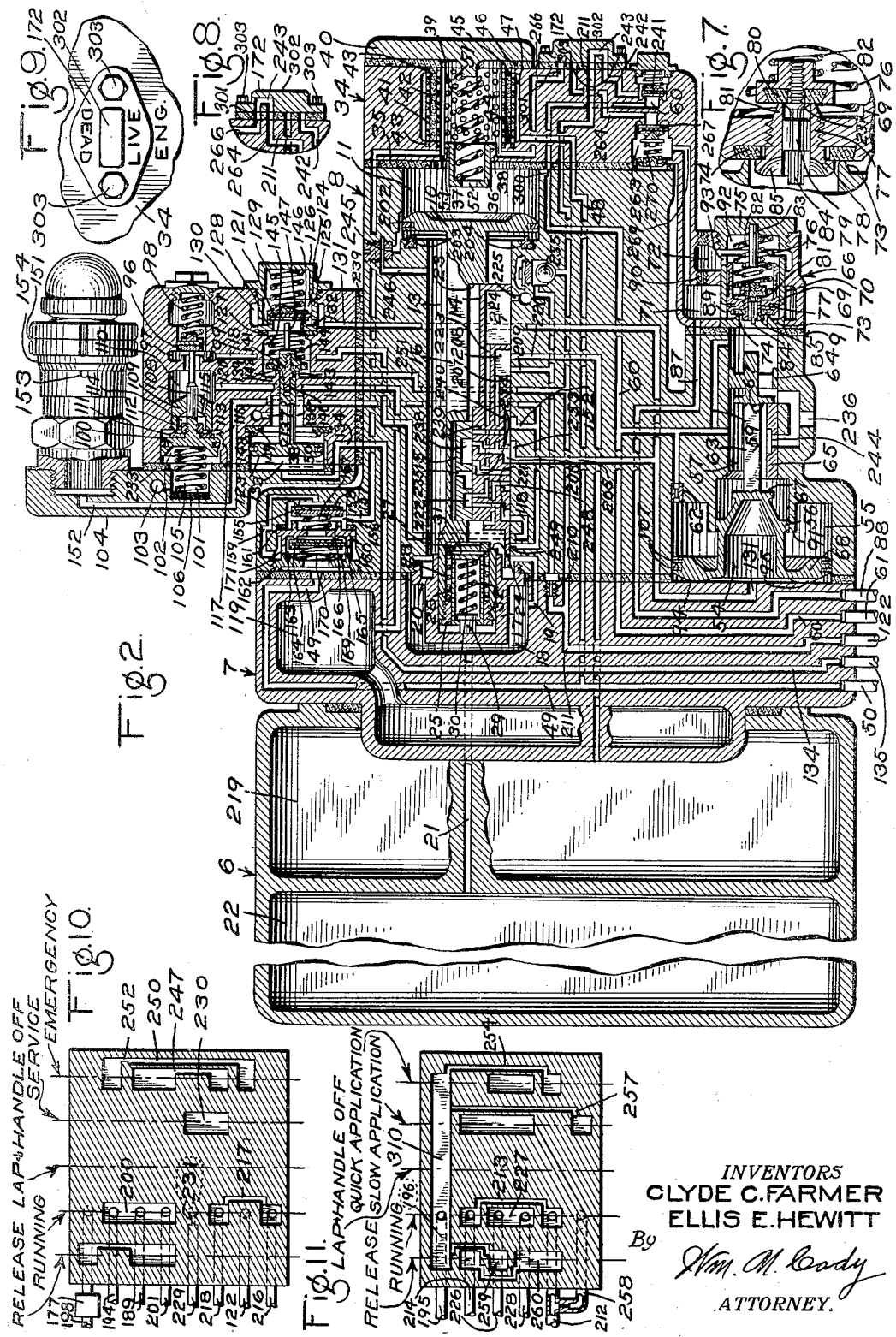
*INVENTORS*
**CLYDE C. FARMER
ELLIS E. HEWITT**
By
*ATTORNEY.*

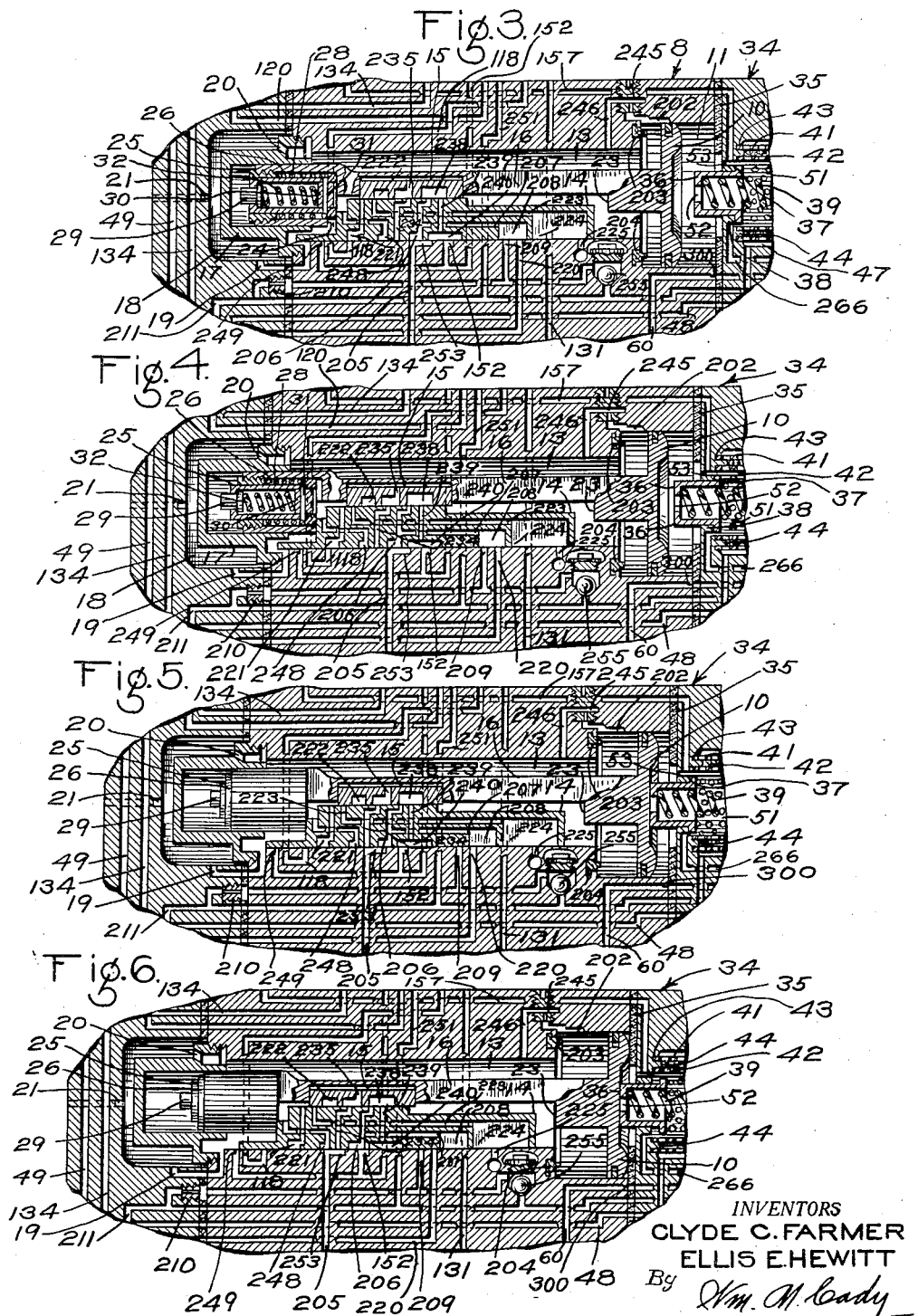

Patented July 30, 1935

2,009,840

UNITED STATES PATENT OFFICE 2,009,840

FLUID PRESSURE BRAKE

Clyde C. Farmer, Pittsburgh, and Ellis E. Hewitt, Edgewood, Pa., assignors to The Westinghouse Air Brake Company, Wilmerding, Pa., a corporation of Pennsylvania Application June 24, 1932, Serial No. 619,052

68 Claims. (Cl. 303—40)

This invention relates to fluid pressure brakes, and more particularly to the type employed for controlling the brakes on a locomotive.

The usual distributing valve device employed on a locomotive consists of an application portion and an equalizing portion. The application portion comprises an application piston contained in an application piston chamber and valves operated by said piston for directly controlling the supply and release of fluid under pressure to and from the locomotive brake cylinder, the operation of the application portion being controlled either by the equalizing portion or by straight air through the medium of the usual independent brake valve device.

The application piston is quite small in diameter and as a result the volume of the application piston chamber, as controlled by the displacement of said piston, is also quite small. In order to prevent leakage from having any material effect on the pressure in the application piston chamber and also to better control variations in pressure in said chamber, an application chamber is provided for increasing the volume of the application piston chamber. The volume of the application chamber is quite large as compared to the displacement of the application piston, so that the displacement of said piston has no material effect upon the pressure which may be acting in the application chamber, which is normally open to the atmosphere and, therefore, at atmospheric pressure.

The equalizing portion of the distributing valve device is similar to the usual triple valve device employed on cars, but is adapted to supply fluid under pressure from a pressure chamber, corresponding to the usual auxiliary reservoir, to the application chamber and the application piston chamber, instead of to a brake cylinder. The application piston is then operated by the pressure of fluid supplied to the application chamber and application piston chamber for supplying fluid under pressure to the brake cylinder.

When a brake cylinder piston is moved out by fluid supplied through a triple valve device, a certain amount of fluid is required from the auxiliary reservoir to fill the vacuum space created by the movement of the brake cylinder piston, before any effective pressure is exerted on the piston, while on the locomotive, since the application chamber is initially filled with fluid at atmospheric pressure, fluid under pressure supplied from the pressure chamber to the application chamber is immediately effective to operate the application piston to supply fluid under pressure to the locomotive brake cylinder, and for the same degree of reduction in pressure in the pressure chamber, as occurs in the auxiliary reservoir on the cars, a higher pressure is obtained in the application chamber and consequently in the locomotive brake cylinder than is obtained in the brake cylinder on the cars, and this results in a more rapid retardation of the locomotive as compared with the cars, which tends to cause the slack in the train to run in toward the locomotive and produce damaging shocks.

It has heretofore been proposed to obviate the above difficulty by providing a reduction chamber or reservoir, into which fluid under pressure from the pressure chamber is permitted to equalize upon the initial movement of the equalizing portion of the distributing valve device toward application position, the reduction in pressure thus effected in the pressure chamber being adapted to delay the supplying of fluid under pressure to the application chamber for applying the locomotive brakes until the piston in the brake cylinder on the cars is moved out to the position in which the continued supply of fluid under pressure from the auxiliary reservoir will apply the brakes with force, so that effective brake cylinder pressure is obtained on the cars at substantially the same time as on the locomotive.

It requires substantially a five pound reduction in auxiliary reservoir pressure to move the brake cylinder piston on a car to the brake applying position and consequently, the reduction reservoir in the distributing valve device on the locomotive should be of such volume as to effect a corresponding reduction in pressure in the pressure chamber in order that the locomotive brakes will start to apply at the same time as the brakes on the cars.

The pressure chamber of the distributing valve device is charged with fluid under pressure from the brake pipe and the pressure obtained in said chamber therefore varies according to the brake pipe pressure carried, so that in effecting an application of the brakes, the equalization of pressures in said chamber and the reduction reservoir, above described, varies, so that although the locomotive brakes start to apply at more nearly the same time as the car brakes than if a reduction reservoir were not employed, still, a synchronous application of the brakes on the locomotive and cars is not obtained, such as is desired and which is particularly necessary in the handling of long trains.

One object of our invention is to provide improved means for obtaining a substantially synchronous application of the brakes on the locomotive and cars of a train, regardless of the brake pipe pressure carried.

We attain this object by providing a valve device which operates to cut off the reduction reservoir from the pressure chamber when the pressure in the reduction reservoir is increased to a predetermined degree. The reduction in pressure thus effected in the pressure chamber is about five pounds, which corresponds to the reduction in auxiliary reservoir pressure on the cars required to move the piston in the brake cylinder on the cars to the brake applying position. This valve device is controlled by reduction reservoir pressure and is therefore independent of the brake pipe pressure carried, so that irrespective of the brake pipe pressure carried, the reduction in pressure in the pressure chamber will be the same, and the locomotive brakes will therefore start to apply at the same time as the brakes on the cars start to apply.

In the usual distributing valve device, the application portion includes a slide valve for controlling the supply of fluid from the main reservoir to the locomotive brake cylinder for applying the brakes. This slide valve is pressed into sealing engagement with its seat by main reservoir pressure and therefore offers considerable resistance to movement. A piston, sealed with a packing cup, is provided for moving the slide valve and due to the resistance of the slide valve and the packing cup to movement, a greater differential of pressures is required over the piston to move the slide valve than is desired.

Another object of our invention is to provide a distributing valve device having an improved application portion which will be sensitive to and operate upon slight changes in pressure so that the brake cylinder pressure may be varied in finer steps than has heretofore been possible.

This object is attained by providing a fluid pressure supply valve of the poppet type, which valve is normally pressed into engagement with its seat by main reservoir pressure and the pressure of a spring, and is adapted to be moved away from its seat by the application piston. Means are provided which are operated by the application piston slightly in advance of engagement of the application piston with the supply valve for substantially balancing the pressures on the supply valve, so that when the application piston engages the supply valve, only a slight differential of pressures on the application piston is required to move the supply valve from its seat. The piston is provided with two metal packing rings so that its resistance to movement is constant and reduced to a minimum, the two rings being provided to better ensure against leakage past the piston than where only one ring is employed, and due to this construction, the piston will operate upon lower pressure differentials than the type employing a packing cup.

In the usual locomotive brake equipment, when an emergency application of the brakes is effected, the actuating pressure on the application piston is maintained against leakage by a supply of fluid under pressure from the main reservoir, this supply being provided through a small port in the rotary valve of the automatic brake valve device when the brake valve device is in emergency position. It will therefore be evident that the actuating pressure on the application piston, and consequently the degree of application of the locomotive brakes, depends upon the main reservoir pressure carried, whereas on the cars, the degree of emergency application depends upon the brake pipe pressure carried. As a result, the pressure maintained in the locomotive brake cylinder, when an emergency application of the brakes is effected, may not be in proportion to the emergency brake cylinder pressure obtained on the cars of the train.

Another object of our invention is to maintain the brake cylinder pressure on the locomotive from the feed valve device, when an emergency application of the brakes is effected, so that the pressure obtained in the locomotive brake cylinder will vary as the brake pipe pressure carried, the same as on the cars.

Other objects and advantages will appear in the following more detailed description of the invention.

In the accompanying drawings; Fig. 1 is a diagrammatic view, partly in section, of a locomotive brake equipment embodying our invention; Fig. 2 is a diagrammatic sectional view of the distributing valve device shown in Fig. 1 with the parts shown in release position; Fig. 3 is a diagrammatic sectional view of the equalizing portion of the distributing valve device with the parts shown in a position assumed in moving from release position towards service position; Fig. 4 is a diagrammatic sectional view of the equalizing portion of the distributing valve device with the parts shown in what may be termed a preliminary reduction position; Fig. 5 is a diagrammatic sectional view of the equalizing portion of the distributing valve device with the parts shown in service position; Fig. 6 is a diagrammatic sectional view of the equalizing portion of the distributing valve device with the parts shown in emergency position; Fig. 7 is an enlarged diagrammatic sectional view of a portion of the supply valve means of the application portion of the distributing valve device; Fig. 8 is a diagrammatic sectional view of a portion of the distributing valve device showing a reversible cover plate in the "dead engine" position; Fig. 9 is a plan view of the reversible cover plate; Fig. 10 is a development diagram of the automatic brake valve device shown in Fig. 1 and illustrating the connections established through said brake valve device in the various positions thereof; and Fig. 11 is a development diagram of the independent brake valve device shown in Fig. 1.

As shown in Fig. 1 of the drawings, the locomotive brake equipment comprises a distributing valve device 1 as applied to an electric locomotive so that it is adapted to be controlled from either end of the locomotive, the equipment provided at each end of the locomotive comprising an automatic brake valve device 2, an independent brake valve 3, a feed valve device 4 and a reducing valve device 5. It will be understood that in the case of a steam locomotive, only one set of controlling units of the above character is associated with the distributing valve device.

The distributing valve device 1 comprises a valve portion, a reservoir portion 6, and a filler portion 7, the filler portion 7 being secured between the valve portion and reservoir portion and preferably providing a bracket to which all pipes leading to and from the distributing valve device are connected.

The valve portion of the distributing valve device comprises an equalizing valve device 8 and an application valve device 9.

The equalizing valve device 8 comprises a piston 10 having at one side a chamber 11 connected to the brake pipe 12 and at the opposite side a chamber 13 containing a main slide valve 14 and an auxiliary slide valve 15 adapted to be operated by the piston 10 through the medium of a stem 16.

The outer end of valve chamber 13 is closed by a cap member 17 having screw-threaded engagement in the casing and projecting into a chamber 18 formed in the filler portion 7. Chamber 18 is in constant communication with valve chamber 11 through a passage 19, which at no time is lapped by the main slide valve 14, and also through a passage 20 in the member 17. Chamber 18 also communicates through passage 21 with a pressure chamber or reservoir 22 provided in the reservoir portion 6, and it will therefore be evident that the valve chamber 13 and pressure chamber 22 are at all times in communication with each other.

The piston stem 16 is cut away so as to form at the piston end of the stem a shoulder 23 adapted to engage the main slide valve, and at the outer end of the piston stem a shoulder 24 adapted to engage the opposite end of the main slide valve. A cavity is also formed in the piston stem 16 for operatively receiving the auxiliary slide valve 15.

The end of the piston stem is provided with a chamber or bore extending into said stem slightly beyond the shoulder 24, the open end of said bore being closed by a plug 25 having screw-threaded engagement with the stem. Slidably mounted in said bore is a plunger 26 having a cylindrical portion freely extending through a suitable bore in the plug 25. The inner end of the plunger 26 is provided exteriorly with an annular rib 27 between which and the inner end of plug 25 is interposed a spring 28 urging the plunger toward the main slide valve 14, it being noted that the rib 27 which provides a seat for spring 28 also extends beyond the shoulder 24 on the stem and is adapted to be moved into operative engagement with the end of the main slide valve before shoulder 24 engages the end of said slide valve.

The plunger 26 is hollow and open at its inner end. The outer end of the plunger 26 is provided with an opening through which a piston stop 29 is adapted to slidably move, said stop being provided with a head portion of a greater diameter than the opening through the end of the plunger so as to limit outward movement of the stop. The open end of the plunger 28 is closed by a plug 30 preferably secured to the plunger by means of a pin 31 extending through said plug and the side walls of the plunger. Interposed between the plug 30 and the head of piston stop 29 is a spring 32 urging the piston stop outwardly.

A gasket 204 is disposed in the casing back of the piston 10 and is provided with a narrow seat rib 203 adapted to engage and effect a seal on said piston.

The open end of piston chamber 11 is closed by a member 34, a gasket 35 being provided to prevent leakage from said chamber to the atmosphere, said gasket extending into said chamber so as to provide a seal for piston 10 in emergency position, as will be hereinafter described.

The member 34 is provided with a chamber having one end closed by a cover plate 40, the opposite end of said chamber being provided with a wall 38 having a passage 53 connecting to piston chamber 11 and having an opening in which a piston stop 36 is slidably mounted. The piston stop 36 is provided with a flange 37 adapted to engage the wall 38, and a spring 39 is interposed between the piston stop 36 and cover plate 40 for urging said piston stop to the position just mentioned.

Contained in the chamber of member 34 is a strainer device comprising two spaced and concentrically arranged tubes 41 and 42, said tubes being made of perforated or screen material, and the space between said tubes is filled with an air straining material, preferably in the form of packed hair. The position of the tube 41 in the chamber is defined by a guide 43 formed at each end of said chamber. The wall 38 of the member 34 is provided with an annular rib 44 adapted to evenly space the inner tube 42 from the outer tube 41 and also to compress the hair in the space near the inner ends of the tubes. A similar rib 45 is provided on a gasket 46 interposed between member 34 and cover plate 40, said rib being adapted to evenly space the outer ends of the two tubes 41 and 42 and also compress the hair or straining material in the space near the outer ends of said tubes. In packing hair into the space between the tubes it is difficult to obtain a uniform density of material the full length of said space and especially at the ends of the space, the density will tend to be less. However, in the construction shown in the drawings, a substantially uniform density will be obtained throughout the full length of the space between the tubes, due to the fact that the annular ribs 44 and 45 will compress the straining material at the ends of the space between the tubes when assembling the device, it being noted that rib 44 is metal and formed in the member 34, while rib 45 is formed integral with the gasket 46.

An annular chamber 47 is formed between the outer tube 41 and the casing, said chamber being connected at all times to brake pipe 12 through passages 48 and 49 and the brake pipe branch pipe 50, while the inner tube 42 defines a chamber 51 connected to piston chamber 11 through passage 53 and an opening 52 in the end of the piston stop 36.

The application valve device 9 comprises an application piston 68 having at one side an application piston chamber 54 and at the opposite side a chamber 55. The piston 68 is provided with a baffle piston 56 slidably mounted in a suitable bore in the casing and separating chamber 55 from valve chamber 57 which is connected to a brake cylinder 58 through passages 59 and 60 and pipe 61, chamber 55 being connected to the brake cylinder passage 59 through a choked passage 62.

The application piston 68 is provided with a stem 63 extending into valve chamber 57, the end of said piston stem being supported and guided by an apertured member 64. The stem 63 is provided with two spaced shoulders 67 between which is mounted a brake cylinder exhaust valve 65 which is adapted to be moved by the engagement of one or the other of said shoulders. The outer end of the piston stem 63 is adapted to operate a supply valve device 66 contained in the member 34 which is secured to the casing of the application valve portion.

The supply valve device comprises a valve piston 69 slidably mounted in a bushing 70 which is pressed into the member 34 and which separates two chambers 71 and 72. The bushing is provided with a seat rib 73 against which a gasket 74 in the end of the valve piston 69 is adapted to seal. The outer wall of chamber 72 is provided with an opening through which the valve piston 69 is adapted to be inserted into the bushing 70, said opening being closed by a cap nut 75 having screw-threaded engagement with the member 34. A spring 76 is interposed between the cap nut 75 and the valve piston 69 for urging said valve piston into sealing engagement with the seat rib 73.

The gasket 74 is secured to the end of the valve piston 69 by means of a screw-threaded member 77 having an enlarged head portion 78 for clamping said gasket and adapted to be engaged by the application piston stem 63.

The member 77 is provided with a longitudinal bore to slidably receive the fluted stem 79 of a pilot valve 80, the end of said member within the valve piston forming a seat rib 81, against which the pilot valve 80 is adapted to effect a seal. A spring 82, contained within spring 76, is interposed between the pilot valve 80 and cap nut 75 for urging said valve into engagement with the seat rib 81. In the cap nut 75, a pin 83 is provided for maintaining the spring 82 in alignment with the pilot valve 80.

The flutes on the stem of the pilot valve 80 terminate short of the face of the head portion 78 of member 77, into an operating pin 84 which projects beyond the face of the head portion 78 of member 77, so as to be engaged by the application piston stem 63 before said stem engages head 78 of the member 77. A slot 85 is provided in the face of the head portion 78 of member 77 so as to vent fluid under pressure, supplied past the unseated pilot valve 80, to valve chamber 57 when the application piston stem 63 is in engagement with member 77.

Chamber 71 is at all times in communication with a main reservoir 86 through a passage 87 and pipe 88, and a plurality of ports 89 are provided in the bushing 70 for connecting chamber 71 to the seating face of the supply valve piston 69, outside of the seat rib 73. Chamber 72 is connected to chamber 71 through a choke plug 90, the flow area through which is adjusted to the venting capacity of the pilot valve 80 as will be hereinafter explained.

The movement of the application piston towards the right hand is limited by engagement with the annular shoulder 91 formed in the casing, and the consequent movement of the supply valve piston 69 away from seat rib 73 is limited to an amount which at all times ensures that communication be maintained between chamber 72 and chamber 92 at the right hand side of said valve piston by way of clearance provided between the right hand end of the bushing 70 and cap nut 75 and also through one or more slots 93 formed in the right hand end of said bushing. The movement of the application piston 68 toward the left hand is limited by engagement of an annular rib 94, formed on said piston, with the casing. A slot 95 is provided through said rib to connect the chamber outside of rib 94 to the chamber inside of said rib when the rib engages the casing. The piston 68 is provided with two packing rings 107 for minimizing leakage of fluid under pressure from one side of the piston to the other.

Secured to the casing of the equalizing valve device is another valve portion comprising a reduction reservoir cut-off valve device and a release valve device.

The reduction reservoir cut-off valve device comprises a poppet valve 96 contained in a chamber 97, a spring 98 for urging said valve into engagement with a seat rib 99, and a movable abutment 100 subject to the pressure of a spring 101 for urging said poppet valve away from the seat rib 99.

The abutment 100 of the reduction reservoir cut-off valve is preferably in the form of a piston having a chamber 102 at one side, said chamber being at all times connected to the atmosphere through a passage 103. The open end of chamber 102 is closed by a cover plate 104 which is provided with a recess 105 for carrying the spring 101, a plurality of shims 106 being placed between the end of said spring and the bottom of the recess for finely adjusting the pressure with which the spring 101 acts on the abutment 100.

The abutment 100 is provided with an operating stem 108 which slidably extends through a bore in a bushing 109 pressed into the casing, and through a chamber 110 into engagement with the cut-off valve 96. A gasket seal 111 is secured to one face of the abutment 100 by means of a clamping nut 112 having screw-threaded engagement with the stem 108. The gasket 111 is provided with a seat rib 113 adapted to effect a leak-proof seal against the end of bushing 109 when spring 101 moves the abutment 100 to the position shown in Fig. 2. In this position of abutment 100, a chamber 114 is defined within the seat rib 113 and is connected to chamber 110 through a passage 115 in the bushing 109, while a chamber 116 is defined outside of said seat rib. A leakage groove 117 is provided in the piston cylinder wall for connecting chamber 116 to chamber 102 when the abutment 100 is in the position shown in the drawings.

The cut-off valve chamber 97 is connected through a passage 118 to the seat of the main equalizing slide valve 14, while chamber 110 is connected to a reduction reservoir 119 through a passage 120.

The release valve device comprises a poppet or cut-off valve 121 for normally closing communication from the application piston chamber 54 to an application and release pipe 122, and a movable abutment or piston 123 for unseating said cut-off valve.

The cut-off valve 121 is contained in a chamber 124 formed in a bushing 125 which is assembled in the casing through an opening closed by a cap nut 126. A gasket 127 is interposed between the bushing and casing and the bushing is pressed into sealing engagement with said gasket in screwing the cap nut into place. The bushing 125 is provided with a seat rib 128 against which the cut-off valve is adapted to be pressed into sealing engagement by means of a spring 129 interposed between said cut-off valve and the cap nut 126. The bushing 125 defines an annular chamber 130 in the casing, which chamber is connected by a passage 131 to the application piston chamber 54, and is also connected through one or more ports 132 in the bushing to chamber 124 within the bushing.

The release piston 123 has at one side a chamber 133 connected through passage 134 to a release pipe 135, and has at the opposite side a chamber 136 which is vented to the atmosphere at all times through an atmospheric passage 137. The release piston is provided with a stem 138 having a sliding fit through an opening provided in a wall 139 of the casing. Carried in the end of stem 138 is a stud 140 having an annular rib 141, between which and a cap nut 144, having screw-threaded engagement with the end of said stud, is disposed a gasket 142 adapted to engage a seat rib 143 formed around the opening in wall 139 of the casing for preventing leakage from a chamber 145 through the clearance space surrounding stem 138 in the casing to chamber 136, when the piston is in the position shown in Fig. 2. A spring 146 is provided in chamber 145 and acts on the cap nut 144 to urge the gasket 142 into sealing engagement with seat rib 143.

Projecting from the cap nut 144 is an operating pin 147 adapted, upon movement of piston 123 towards the right hand, to engage the cut-off valve 121 and move said valve away from seat rib 128, such movement of piston 123 also moving the valve 142 away from seat rib 143. The release piston in its right hand position is adapted to seal on a rib 148 provided on a gasket 149 carried in the casing. In the normal position of the release piston, shown in Fig. 2, a leakage groove 150 connects chamber 133 to chamber 136.

The open end of the release piston chamber 133 is closed by the cover plate 104 which also forms a bracket to carry a safety valve device 151 and is provided with a passage 152 through which communication is established from said safety valve device to the seat of the equalizing slide valve 14.

The safety valve device 151 is of the usual well known construction adapted to blow down any excess of fluid pressure above the degree of pressure at which the safety valve device is set, and is provided with a port 153 through which fluid under pressure is adapted to be vented from passage 152 to the atmosphere, the flow capacity of port 153 being adjustable by a ring 154 having screw-threaded engagement with the casing and adapted to regulate the degree of opening of the port 153.

Contained in the casing of the equalizing valve portion is a check valve arrangement adapted to provide a by-pass from the brake pipe 12 to the equalizing piston chamber 11 in case the strainer device in member 34 becomes clogged up. This check valve arrangement comprises a check valve 155 contained in a chamber 156 connected to the equalizing piston chamber through a passage 157 and strainer chamber 51, said check valve being adapted to seal on a seat rib 158 for closing communication from chamber 156 to a passage 159 connected to the brake pipe 12. A cage member 160 is disposed in the casing in engagement with a gasket 161 and a plug member 162 is screwed into the casing and presses the cage member 160 into sealing engagement with the gasket 161. The cage member 160 and plug member 162 cooperate to form a chamber 163 containing a check valve 164 adapted to seal on a seat rib 165, formed on said cage member, for closing communication from chamber 163 to chamber 156 through an aperture formed in said cage member. A rib 166 on one side of the cage member 160 acts as a stop for limiting the unseating movement of the check valve 155 and a light spring 167 is interposed between said cage member and said check valve for urging said check valve into engagement with seat rib 158. A rib 169 on the plug member 162 is adapted to limit the unseating movement of the check valve 164 and a light spring 170 is interposed between said plug member and check valve for urging said check valve into engagement with the seat rib 165. The chamber 163 is connected through an aperture 171 in the side wall of the cage member 160 to passage 159 and is also connected directly to the brake pipe 12 through passage 49 and pipe 50.

Due to the fact that the plug member 162 is secured in the casing, it will be obvious that the check valves 155 and 164 will be maintained properly assembled in case the equalizing valve device is removed from the filler portion 7.

If the strainer device in the casing member 34 should become so restricted as to prevent the flow of fluid under pressure from the brake pipe 12 to the equalizing piston chamber 11 and from said chamber to the brake pipe, then fluid under pressure from the brake pipe 12 will flow to said chamber by way of pipe 50, passage 49, chamber 163, aperture 171 in the wall of cage member 160, passage 159, past the check valve 155 to chamber 156 and from thence through passage 157 to chamber 51 inside of the strainer device and from chamber 51 to the equalizing piston chamber 11. Upon a reduction in brake pipe pressure, fluid under pressure will flow from the equalizing piston chamber 11 to the brake pipe by way of chamber 51, through passage 157, chamber 156, past the check valve 164 to chamber 163 and from thence through passage 49 and pipe 50 to brake pipe 12. Due to the fact that springs 167 and 170 only exert sufficient pressure on the check valves 155 and 164 to ensure seating of said valves, the flow of fluid to and from the equalizing piston chamber 11 will not be materially delayed over the flow through the strainer device when it is in working condition, so that even though the strainer device may become clogged, the equalizing valve device will operate as intended in accordance with variations in brake pipe pressure.

The automatic brake valve device 2 is of the usual construction comprising a casing having a chamber 177 containing a rotary valve 178 adapted to be operated by a handle 179 through the medium of a shaft 180. Secured to the casing is the usual handle guard 181 for preventing removal of handle 179 from the shaft 180 except when the handle is in the usual lap or handle off position, lap position being the position in which the automatic brake valve device 2 is shown at the right hand side of Fig. 1. Contained in the automatic brake valve device is the usual equalizing discharge valve mechanism comprising a piston 182 and a brake pipe discharge valve 183 operative by said piston. The piston 182 has at one side a chamber 184 connected to the usual equalizing reservoir 185 through a passage and pipe 186, and a chamber 187 at the opposite side connected through a passage 189 and pipe 188 to the brake pipe 12.

The independent brake valve device is of the usual construction comprising a casing having a chamber 310 containing a rotary valve 190 adapted to be operated by a handle 191 through the medium of a shaft 192. Secured to the casing is the usual handle guard 193 for preventing removal of handle 191 from the shaft 192 except when the handle is in the usual lap or handle off position, said position being the position in which the brake valve device at the right hand side of Fig. 1 is shown.

The feed valve device 4 may be of the usual construction adapted to supply fluid at a reduced pressure as carried in the brake pipe to pipe and passage 194 connecting to the seat of the rotary valve 178 in the automatic brake valve device 2.

The reducing valve device 5 may be similar in construction to the feed valve device 4 and adapted to supply fluid at the desired reduced pressure, such as that employed in controlling the brakes by operation of the independent brake valve device 3, to pipe and passage 195 connecting to the seat of the rotary valve 190 in the independent brake valve device. A port 196 is provided through the rotary valve 190 for at all times maintaining communication from passage 195 to rotary valve chamber 310 so that in all positions of the independent brake valve device, the rotary valve chamber 310 is charged with fluid at reducing valve pressure.

In operation, both the automatic brake valve device 2 and independent brake valve device 3 at the non-operating end of the locomotive are turned to handle-off or lap position and the handle of each brake valve device is then removed and placed on the corresponding brake valve device at the control end of the locomotive. In the present instance, it will be assumed that the brake valve devices at the left hand side of Fig. 1 are at the operating end, the brake valve devices at the right hand side of Fig. 1 being both shown in the handle-off or lap position. Since the operation of the brake equipment is the same from both ends of the locomotive, the operation or control only from the left hand end will be described, the operation from the right hand end being the same as from the left hand end. It will also be understood that on a steam locomotive, where only a single automatic brake valve and independent brake valve are provided, the operation will be the same. The main reservoir 86 is maintained charged with fluid under pressure in the usual well known manner and fluid under pressure flows from said reservoir through pipe 88 to the automatic brake valve device 2, the feed valve device 4 and reducing valve device 5 at each end of the locomotive, and also from pipe 88 to the distributing valve device 1.

Fluid at main reservoir pressure supplied to the automatic brake valve device 2 flows through passage 198 to the rotary valve chamber 177 and acts in said chamber to press the rotary valve 178 into engagement with its seat. At the non-operating end of the locomotive, fluid at main reservoir pressure flows from the rotary valve chamber 177 through a port 199 in rotary valve 178 to passage 194 leading to the feed valve device 4, so that the feed valve device is subject on each side to main reservoir pressure and therefore placed in a balanced condition.

The reducing valve device 5 operates to reduce the main reservoir pressure in pipe 88 to that employed in controlling the brakes by the independent brake valve device 3, and to supply fluid at the reduced pressure to pipe 195 from which fluid at the reduced pressure flows through port 196 in the rotary valve 190 of the independent brake valve device to the rotary valve chamber 310 and presses said rotary valve into engagement with its seat.

The feed valve device 4 at the control end of the locomotive operates to reduce the main reservoir pressure supplied through pipe 88 to the pressure desired to be carried in the brake pipe 12, and to supply fluid at the reduced pressure to pipe 194, through which fluid at feed valve pressure flows to the seat of the rotary valve 178 in the automatic brake valve device.

With the automatic brake valve device 2 at the control end of the locomotive in running position as shown in Fig. 1, a cavity 200 in rotary valve 178 connects passage 194 to the brake pipe passage 189 and to a passage 201 connected to the equalizing piston chamber 184, so that fluid at feed valve pressure is supplied through passage 189 to the equalizing discharge valve piston chamber 187, and from passage 189 through pipe 188 to brake pipe 12, and at the same time through passage 201 to the equalizing discharge valve piston chamber 184. From chamber 184, fluid under pressure flows through passage and pipe 186 to the equalizing reservoir 185. The chambers 184 and 187 at the opposite sides of the equalizing discharge valve piston 182, and the equalizing reservoir 185 are thus charged with fluid at substantially the same time and at substantially the same pressure, so that said piston operates in the usual manner to hold the brake pipe discharge valve 183 seated.

Fluid under pressure supplied to the brake pipe 12 flows therefrom through branch pipe 50 to the distributing valve device 1, and from thence through passages 49 and 48 to chamber 47 surrounding the strainer device in the member 34. From chamber 47 fluid under pressure flows through the strainer device to chamber 51 and from thence through passage 53 and opening 52 in the piston stop 36 to the equalizing piston chamber 11.

With the equalizing piston 10 in the normal release position, shown in Fig. 2, which position is defined by the mere engagement of piston stop 29 with cap member 17, fluid under pressure flows from piston chamber 11 through a feed groove 202 and from thence through the space between the back of said piston and the sealing rib 203 on gasket 204, to valve chamber 13, and from thence through passage 19 at the inner end of the main slide valve 14 to chamber 18, then through passage 21 to the pressure chamber 22, so that the equalizing valve chamber 13 and pressure chamber 22 are charged with fluid to the pressure carried in the brake pipe.

With the equalizing slide valves 14 and 15 in the normal release position, shown in Fig. 2, the application piston chamber 54 is opened to the atmosphere through passages 131 and 205, cavity 206, port 207 and cavity 208 in the slide valve 14, passage 209, choke plug 210, passage 211, application and release pipe 122 leading to the independent brake valve device 3, passage 212 in said brake valve device, cavity 213 in the rotary valve 190, passage 214, pipe 215 leading from the independent brake valve device to the automatic brake valve device, passage 216 in the automatic brake valve device, cavity 217 in the rotary valve 178 and from thence through passage 218 to the atmosphere. The application chamber 219 is connected to a passage 220 which leads to the seat of slide valve 14 and which registers in release position with cavity 208, so that the application chamber is also connected to the atmosphere, with the application piston chamber.

In initially charging the distributing valve device, and with the application piston chamber 54 open to the atmosphere, as above described, the supply valve piston 69 is pressed into engagement with seat rib 73 by means of spring 76, and the pilot valve 80 is seated by spring 82, while chamber 92 at the back of the supply valve piston and chambers 72 and 71 are charged with fluid under pressure from the main reservoir 86 pipe 88, through passage 87 and choke plug 90.

With the slide valves 14 and 15 of the equalizing portion in the normal release position shown in Fig. 2, the reduction reservoir 119 is vented to the atmosphere through passage 120, chamber 110 in the reduction reservoir cut-off valve device, past the cut-off valve 96 to chamber 97, thence through passage 118, port 221 in the main slide valve 14, cavity 222 in the auxiliary slide valve 15, port 223 and cavity 224 in the main slide valve 14 and an atmospheric passage 225.

With the independent brake valve device 3 in the usual running position, as shown in Fig. 1, the release piston chamber 133 of the release valve device in the distributing valve device is vented to the atmosphere through passage 134, pipe 135 leading from the distributing valve device to the independent brake valve device, passage 226 in said brake valve device, cavity 227 in the rotary valve 199 and atmospheric passage 228. With the release piston chamber 133 vented to the atmosphere, spring 146 seats the valve 142 on seat rib 143. In this position of valve 142, pin 147 is out of engagement with the cut-off valve 121, and said cut-off valve is seated against seat rib 128 by the spring 129.

If it is desired to effect a service application of the brakes on the locomotive, the automatic brake valve device 2 is turned to service position in which fluid under pressure is vented from the equalizing discharge valve piston chamber 184 and the connected equalizing reservoir 185 through passage 229, cavity 230 in rotary valve 178 and the atmospheric passage 218, as will be clear from Fig. 10, the rate at which fluid is vented being governed by the usual preliminary exhaust choke 231. As the pressure of fluid acting in chamber 184 of the equalizing discharge valve device is thus reduced, brake pipe pressure acting in chamber 187 moves said piston upwardly, which pulls the brake pipe discharge valve 183 from its seat and permits fluid under pressure to flow from the brake pipe 12 through pipe 188, passage 189, chamber 187, past the discharge valve 183 and to the atmosphere through the usual exhaust choke fitting 232.

As the brake pipe pressure is reduced in the above manner, fluid under pressure flows back from the equalizing piston chamber 11 to the brake pipe 12, effecting a corresponding reduction in pressure in chamber 11.

Upon a reduction in pressure in piston chamber 11, the pressure of fluid in valve chamber 13 moves the piston 10 and auxiliary slide valve 15 outwardly relative to the main slide valve 14, until the shoulder 24 on the end of the piston stem 16 engages the end of the main slide valve 14, as shown in Fig. 4.

In the traverse of piston 10 to the position shown in Fig. 4, the shoulder 27 on plunger 26 engages the end of the main slide valve 14 at the time said piston closes communication from piston chamber 11 to valve chamber 13 through the feed groove 202, and the auxiliary slide valve 15 closes communication between ports 221 and 223 in the main slide valve 14. The continued movement of the piston 10 and auxiliary slide valve to the position shown in Fig. 4 moves the plunger 26 inwardly of the piston stem against the opposing pressure of spring 28, but this is merely incidental in effecting an application of the brakes. The purpose of spring 28 and plunger 26 will hereinafter be described in detail.

In the position of piston 10 and the auxiliary slide valve 15 shown in Fig. 4, the port 221 through the main slide valve is opened to valve chamber 13 so that fluid under pressure is permitted to flow from said valve chamber and the connected pressure chamber 22 through said port to passage 118 and from thence to valve chamber 97 in the reduction reservoir cut-off valve device, then past the normally unseated valve 96 to chamber 110 and from thence through passage 120 to the reduction reservoir 119.

The venting of fluid under pressure from the equalizing valve chamber 13 and connected pressure chamber 22 to the reduction reservoir 119 at the same time as the brake pipe pressure is being reduced in the equalizing piston chamber 11 prevents the build up of a sufficient pressure differential on the piston 10 to cause the movement of the main slide valve 14. This venting of fluid to the reduction reservoir 119 continues until a predetermined pressure, such as fifty pounds, is obtained in said reservoir and chamber 110 of the reduction reservoir cut-off valve device. Fluid under pressure flows from chamber 110 through passage 115 in the bushing 109 to chamber 114 at one side of the cut-off valve piston 100 and builds up a pressure on said piston as the pressure increases in the reduction reservoir. Now, at the time fifty pounds pressure is obtained in the reduction reservoir, the pressure acting on the cut-off valve piston 100 overcomes the opposing pressure of spring 101 and moves piston 100 outwardly. Fluid which may leak past the gasket 111 when the piston 100 is seated against seat rib 113 escapes to the atmosphere through groove 117 and chamber 105, but the initial outward movement of piston 100 closes the groove 117 and also permits fluid under pressure from chamber 114 to act on the full area of piston 100, which causes said piston to promptly move to its outermost position, in which it engages and seals upon a gasket 233.

The outward movement of piston 100 pulls the stem 108 away from the cut-off valve 96, permitting said valve to be urged into engagement with seat rib 99 by the spring 98, so as to prevent further flow of fluid under pressure from the pressure chamber 22 and equalizing valve chamber 13 to the reduction reservoir 119.

As above mentioned, the reduction reservoir cut-off valve piston is operated to close communication to the reduction reservoir 119 when a predetermined pressure, of for instance fifty pounds, is obtained in said reservoir, the volume of the reduction reservoir 119 being so proportioned to the combined volumes of the pressure chamber 22 and equalizing valve chamber 13 that when fifty pounds pressure is obtained in the reduction reservoir, a reduction of approximately five pounds is effected in the pressure in the pressure chamber 22, regardless of the pressure to which the pressure chamber is initially charged from the brake pipe. It will thus be evident, that regardless of the normal degree of brake pipe pressure carried, the reduction reservoir cut-off valve device operates to limit the reduction in pressure in the pressure chamber to about five pounds, which corresponds to the reduction required in the pressure in the auxiliary reservoir on a car for moving the brake cylinder piston on the car to the brake applying position.

After the reduction reservoir cut-off valve operates to close communication from the pressure chamber 22 to the reduction reservoir, and when the brake pipe pressure becomes reduced a predetermined degree below the reduced pressure acting in the equalizing valve chamber 13, the equalizing piston 10 is operated and moves the auxiliary slide valve 14 and main slide valve 15 to service position, shown in Fig. 5.

The initial movement of the piston 10 and auxiliary slide valve 15 relative to the main slide valve 14 connects the service port 234 to the valve chamber 13 through a port 235 in the auxiliary slide valve 15, and in service position of the main slide valve, the service port 234 registers with passage 205 so that fluid under pressure is permitted to flow from the pressure chamber 22 through the equalizing valve chamber 13 to passage 205 and from thence through passage 131 to the application piston chamber 54.

In the service position of the main slide valve 14, communication is maintained between the application chamber 219 and application piston chamber 54 through passage 220, cavity 208, port 207 and cavity 206 in said slide valve, and passages 205 and 131 so that fluid under pressure is supplied to both of said chambers at the same time, the chamber 219 being provided to increase the volume of the application piston chamber 54 in effecting a service application of the brakes.

Fluid under pressure thus supplied to the application piston chamber 54 and application chamber 219 acts on the application piston 68 and moves said piston toward the right hand, the initial movement of said piston being relative to the brake cylinder exhaust valve 65 until the shoulder 67 engages the end of said valve. Further movement of piston 68 then moves the slide valve to the right so as to lap the brake cylinder release passage 236.

After the brake cylinder release passage 236 is closed, the continued movement of the application piston 68 brings the end of the stem 63 into operating engagement with the pilot valve pin 84, and then the pilot valve 80 is moved out of engagement with seat rib 81 against the opposing pressure of the light seating spring 82.

The unseating of the pilot valve 80 vents fluid under pressure from chambers 92 and 72 to the application valve chamber 57 at such a rate relative to the capacity of the choke plug 90 to supply fluid under pressure to said chambers, that the pressure in said chambers is reduced to a degree such that there remains only a slight pressure differential acting on the valve piston 69 tending to hold same seated.

The application piston stem 63 moves into engagement with the head portion 78 of the member 77 in unseating the pilot valve 80, but venting communication past the pilot valve 80 to valve chamber 57 is maintained through the slot 85, and as soon as the pressure is reduced in chamber 92 at the back of the valve piston 69, the application piston 68 moves the valve piston 69 away from the seat rib 73. It will thus be seen that the valve piston 69 will be unseated by operation of the application piston 68, when only a slight increase in pressure in the application piston chamber 54 has been made.

The unseating of the supply valve piston 69 permits fluid under pressure, as supplied from the main reservoir 86 through pipe 88 and passage 87 to chamber 71, to flow from said chamber past said valve piston to the application valve chamber 57 and from thence to the brake cylinder 58 through passages 59 and 60 and pipe 61, thereby applying the locomotive brakes.

In effecting a service application of the brakes, the degree of the application depends upon the degree of reduction in brake pipe pressure, the maximum application being obtained if a full service reduction in brake pipe pressure is effected. If less than a full service reduction in brake pipe pressure is effected, then when the pressure acting in the equalizing valve chamber 13 is reduced, by flow to the application piston chamber 54 and application chamber 219, to a degree slightly below the reduced brake pipe pressure acting in piston chamber 11, the equalizing piston 10 is moved toward the left to lap position, this movement of piston 10 shifting the auxiliary slide valve 15 so as to lap the service port 234 through the main slide valve 14 and thereby cut off the supply of fluid under pressure to the application piston chamber 54.

As fluid under pressure is supplied to the brake cylinder, fluid under pressure flows from the brake cylinder passage 59 through the choke passage 62 to the application piston chamber 55, and when the pressure of fluid in said chamber acting on the application piston 68, plus the pressure in valve chamber 57 acting on one side of the baffle piston 56, becomes slightly greater than the pressure in chamber 54 acting on the opposite side of piston 68, the application piston 68 is moved toward the left hand to lap position. As the piston 68 moves toward lap position, spring 76 moves the valve piston 69 into engagement with seat rib 73, following which, spring 82 seats the pilot valve 80, so that the supply of fluid under pressure to the brake cylinder is cut off.

If less than a full service application of the brakes is effected, a further reduction in brake pipe pressure will cause the equalizing piston 10 to move the auxiliary slide valve 15 from lap position to service position and cause the application valve device to again function in the same manner as above described to increase the brake cylinder pressure in accordance with the degree of brake pipe reduction.

In order to prevent a fluttering or vibratory movement of the application piston 68 and supply valve piston 69 when supplying fluid under pressure to the brake cylinder, the baffle piston 56 is provided to prevent the rapid build up of pressure in valve chamber 57 from being effective in chamber 55, while the supply of fluid to chamber 55 is retarded by choked passage 62 and leakage past said baffle piston. By this means, the pressure in the application piston chamber 54 increases slightly in advance of the increase in pressure in chamber 55, so that as long as fluid is being supplied to chamber 54, the application piston 68 will maintain the supply valve piston 69 unseated, and it will be noted that the extent to which the valve piston 69 is unseated in effecting a service application of the brakes is only sufficient to permit the brake cylinder pressure and the pressure in chamber 55 to build up at a rate substantially equal to the service rate of supply of fluid under pressure to the application piston chamber 54.

When the supply valve piston 69 is unseated, the opposing fluid pressures acting on said valve piston are substantially equal, but the application piston 68 holds said valve piston unseated against the pressure of spring 76 which aids the pressure in chamber 55 to move the application piston toward lap position, so that the pressure obtained by flow past the supply valve piston 69 to the brake cylinder will be less than the actuating pressure in the application piston chamber 54 by an amount equal to the value of spring 76. However, after the valve piston 69 seats, a continued flow of fluid under pressure to the brake cylinder occurs past the unseated pilot valve 80 until the brake cylinder pressure builds up to within the value of the light spring 82 acting on said pilot valve, at which time the application piston 68 is moved to the lap position to permit the seating of said pilot valve. Due to the fact that the pilot valve spring 82 is very light as compared to the valve piston spring 76, the brake cylinder pressure will be increased to substantially the actuating pressure in the application piston chamber 54.

If there should be leakage of fluid under pressure from the brake cylinder, then as soon as the pressure acting in chamber 55 on the application piston 68 and in valve chamber 57 on the baffle piston 56 is reduced below the actuating pressure in the application piston chamber 54 an amount slightly exceeding the pressure acting to seat the pilot valve 80, the application piston 68 is adapted to unseat the pilot valve 80 and supply fluid under pressure from valve piston chamber 92 to the brake cylinder to compensate for such leakage.

The pilot valve stem 79 adjacent the seat, is provided with a cone-shaped portion 237, most clearly shown in Fig. 7, for varying the area of opening through which fluid under pressure is adapted to flow from the valve piston chamber 92 to valve chamber 57, and from thence to the brake cylinder, so that in maintaining the brake cylinder pressure against leakage, the pilot valve 80 will be moved away from the seat rib 81 until the rate of supply of fluid to the brake cylinder, as governed by the flow area past the cone-shaped portion 237, is just equal to the rate of leakage of fluid under pressure from the brake cylinder. In fact, when there is leakage of fluid under pressure from the brake cylinder, the application piston 68 may never permit the pilot valve 80 to seat, when supplying fluid under pressure to the brake cylinder, but instead, said piston will move toward lap position until the supply of fluid past the pilot valve just equals the rate of leakage of fluid under pressure from the brake cylinder.

It is well known that in the case of an ordinary poppet valve, the area of the opening through which fluid under pressure may flow varies according to the amount the poppet valve is unseated, but the movement of said poppet valve from the seated position to the wide open position is so small that the area of the opening cannot be readily controlled. By providing the cone-shaped portion 237 on the poppet valve stem however, the above mentioned limitation of the ordinary poppet valve is overcome and the area of the opening through which fluid under pressure can flow is varied through a greater range of movement and therefore can be accurately controlled.

When the equalizing slide valves 14 and 15 are moved to service position, the application piston chamber 54 and the connected application chamber 219 are connected to the safety valve device 151 by way of the application piston chamber passage 205, cavity 206 and port 207 in slide valve 14, a cavity 238 in the auxiliary slide valve 15, port 239 and cavity 240 in the main slide valve 14 and from thence through passage 152, so that in effecting a service application of the brakes, the safety valve device will prevent the accumulation of a pressure in said chambers exceeding the adjustment of said safety valve device. When the auxiliary slide valve 15 is moved relative to the main slide valve 14 from service position to lap position, the ports 239 and 207 are disconnected from each other and both lapped, so that the fluid under pressure in application piston chamber 54 and application chamber 219 is bottled up, thus preventing possible leakage past the safety valve device from undesirably reducing the actuating pressure on the application piston when the controlling valves are in lap position.

In effecting an application of the brakes, the application and release pipe 122 is charged with fluid under pressure from the brake cylinder passage 60 through a choke 300 in said passage, past a check valve 241, through a passage 242, through a cavity 243 in the "Live-Dead Eng" cover plate 172, and through passage 211, the purpose of which will be fully described hereinafter.

In order to effect a release of the brakes after a service application, the automatic brake valve device 2 at the operating end of the locomotive may be turned to the running position shown in Fig. 1 to effect the release of the brakes if the train is a short one. In running position the brake pipe 12, equalizing reservoir 185 and equalizing discharge valve piston chambers 184 and 187 are charged with fluid under pressure from the feed valve device 4 in the same manner as in initially charging the brake equipment.

As the brake pipe pressure is increased, fluid under pressure flows from said brake pipe to the equalizing piston chamber 11 of the distributing valve device, and when the pressure in said chamber is increased to a predetermined degree above the opposing pressure in valve chamber 13, the equalizing piston 10 is operated to shift the main slide valve 14 and auxiliary slide valve 15 back to the normal release position shown in Fig. 2, this position being defined by the mere engagement of the piston stop 29 with the cap member 17.

In this normal release position, the equalizing valve chamber 13 and pressure chamber 22 are charged up to brake pipe pressure by the supply of fluid under presssure from piston chamber 11 through the feed groove 202.

In the normal release position of the equalizing slide valves 14 and 15, the application piston chamber 54 is connected through passages 131 and 205 to cavity 206 in the slide valve 14 and from thence through port 207 in said slide valve to cavity 208, to which cavity the application chamber 219 is also connected through passage 220, so that fluid under pressure is vented simultaneously from both of said chambers by way of the cavity 208, passage 209, choke plug 210, passage 211, pipe 122 leading to the independent brake valve device, passage 212 in said brake valve device, port 213 in the rotary valve 199, passage 214, pipe 215 connecting the independent brake valve device to the automatic brake valve device, passage 216 in the automatic brake valve device, port 217 in the rotary valve 178 and through the atmospheric passage 218.

The venting of fluid under pressure from the application piston chamber 54 reduces the pressure in said chamber so that the opposing pressure in chambers 55 and 57 is permitted to move the application piston 68 to the release position shown in Fig. 2. This movement of the application piston 68 causes the shoulder 67 on the piston stem 63 to engage the exhaust slide valve 65 and move said slide valve to the release position in which the valve chamber 57 is connected to the atmosphere past the right hand end of said slide valve and through a port 244 in said slide valve to the atmospheric passage 236. With the valve chamber 57 thus connected to the atmosphere, fluid under pressure is vented from the brake cylinder 58 through pipe 61, passages 60 and 59, valve chamber 57, through the exhaust slide valve 65 and the atmospheric passage 236, thereby effecting a release of the brakes.

As hereinbefore described in connection with effecting a service application of the brakes, the application and release pipe 122 is charged with fluid under pressure from the brake cylinder 58 by way of the check valve 241 and through cavity 243 in the "Live-Dead Eng" cover plate 172, so that when the application piston chamber 54 and application chamber 219 are connected to said pipe upon movement of the equalizing slide valves 14 and 15 to the normal release position, there will not be an uncontrolled reduction in pressure by flow of fluid from said chamber into said pipe and a consequent uncontrolled partial release of the brakes, as would otherwise occur if said pipe had to be charged with fluid under pressure from said chambers in effecting a release of the brakes. The choke plug 210 is provided to control the rate at which the locomotive brakes release, the object being to synchronize the release of the locomotive brakes with the release of the brakes on the train.

Since the release of the locomotive brakes is controlled through passage 216 in the automatic brake valve device 2, the automatic brake valve device may be moved to lap position and lap passage 216 so as to limit the degree of reduction in pressure in the application piston chamber 54 and application chamber 219. If the degree of reduction in the application piston chamber is thus limited, fluid under pressure will continue to be vented from the brake cylinder only until the pressure acting in valve chamber 57 and piston chamber 55 is reduced to a degree slightly below the pressure in chamber 54, at which time the application piston 68 will be moved to the right and will shift the slide valve 65 so as to lap the brake cylinder exhaust passage 236, thereby preventing a further reduction in brake cylinder pressure. When desired, the automatic brake valve device may again be moved to running position and a further release of the locomotive brakes will be effected. It will thus be evident, that when the automatic brake valve device is alternately moved between running and lap positions for increasing the brake pipe pressure in steps to effect the usual graduated release of brakes on the train, the locomotive brakes will be graduated off simultaneously.

Especially in handling a long train, it is the usual practice to accelerate the charging of the brake pipe by moving the brake valve device to release position before moving to running position, so as to supply fluid at the high pressure carried in the main reservoir directly to the brake pipe, and then after a certain lapse of time the brake valve device is moved from the release position to the running position.

The supplying of fluid under pressure directly from the main reservoir to the brake pipe, with the automatic brake valve device in release position, causes a rapid increase in brake pipe pressure at the head end of the train, which in turn accelerates the operation of the triple valve devices on cars at the head end of the train to release the brakes on said cars. In order to prevent the cars at the head end of the train, on which the brakes release as just described, from running away from the remainder of the train on which the brakes are still applied, the locomotive brakes are held applied by lapping passage 216 in the automatic brake valve device, through which passage the locomotive brakes are released in running position of the brake valve device, as hereinbefore described.

If the brake valve device is moved to release position in effecting a release of the brakes, the rapid increase in brake pipe pressure exceeds the flow capacity of the feed groove 202 around the equalizing piston 10 to such an extent that a sufficient differential of pressures is obtained between the pressure in the valve chamber 13 and the pressure in the piston chamber 11 to move the piston 10 inwardly from the normal release position shown in Fig. 2, to an inner position in which said piston engages and seals upon the bead 203 of gasket 204, the movement to this inner position being opposed by the control spring 32 in the end of the piston stem 16.

With the equalizing piston 10 sealing on the gasket bead 203, fluid supplied from the brake pipe through feed groove 202 must flow through a choke plug 245 and passage 246 to the valve chamber 13 and from thence to the pressure chamber 22. The flow capacity of the choke plug 245 is such that arranged in series with feed groove 202, the valve chamber 13 and pressure chamber 22 will not become charged to a pressure higher than that carried in the brake pipe during the time the automatic brake valve device is in release position supplying fluid at main reservoir pressure to the brake pipe. When the brake valve device is turned from the release position to the running position, the pressure of fluid in the brake pipe and in the equalizing piston chamber 11 reduces, due to equalization toward the rear of the train, to that supplied by the feed valve device 4, and after the brake pipe pressure thus reduces, the pressure of spring 32 in the end of the equalizing piston stem 16, moves the equalizing piston 10 outwardly to the normal release position shown in Fig. 2.

When the equalizing piston 10 is moved to the inner position, the main slide valve 14 is also moved to an inner position and remains there when the piston 10 is returned to its normal position by the action of spring 32. The auxiliary slide valve 15 however moves with the piston 10 from the inner position to the normal position, but the same communications are maintained through said slide valves in both the normal and inner release positions, so that the operation of said valves in effecting a service application of the brakes when the slide valve 14 is in the inner position is the same as hereinbefore described.

With the equalizing slide valve 14 in either the normal release or inner release position, passage 118 is opened to the atmosphere through port 221 in the main slide valve 14, cavity 222 in the auxiliary slide valve 15, port 223 and cavity 224 in said main slide valve and atmospheric passage 225. Passage 118 communicates with chamber 97 in the reduction reservoir cut-off valve device, so that fluid is vented from said chamber which permits fluid at reduction reservoir pressure in chamber 110 to unseat the poppet valve 96 and flow to chamber 97 and from thence to the atmosphere through passage 118. When the reduction reservoir pressure in chamber 110 and acting in chamber 116 on piston 100 is reduced to below the opposing pressure of spring 101 on said piston, the spring 101 returns said piston to the position shown in the drawings. In this position of the piston 100, the piston stem 108 engages and holds the poppet valve 96 unseated so as to permit a complete release of fluid under pressure from the reduction reservoir 119.

If it is desired to effect an emergency application of the brakes, the automatic brake valve device is turned to emergency position, in which position fluid under pressure is rapidly vented from the brake pipe 12 through pipe 188, passage 189, cavity 247 in the rotary valve 178 and from thence to the atmosphere through the atmospheric passage 218, as indicated in Fig. 10. The resultant sudden reduction in pressure in the brake pipe and equalizing piston chamber 11 of the distributing valve device permits the pressure in valve chamber 13 to move the equalizing piston 10 and slide valves 14 and 15 from the release position to the emergency position defined by engagement of the piston 10 with the gasket 35, as shown in Fig. 6.

In emergency position of the main slide valve 14, fluid under pressure is permitted to flow from valve chamber 13 and pressure chamber 22 through an emergency port 248 in said slide valve to passage 205 and from thence to the application piston chamber 54. Fluid under pressure thus supplied to chamber 54 moves the application piston 68 into engagement with the shoulder 91, such movement first shifting the exhaust slide valve 65 so as to lap the release passage 236 and then unseating the supply valve piston 69 for supplying fluid under pressure to the brake cylinder 58 for applying the brakes in the same manner as when a service application of the brakes is effected.

In emergency position of the main slide valve 14, the pressure chamber 22 and valve chamber 13 are connected only to the application piston chamber 54, the application chamber 219 being cut off, so that the pressure in the pressure chamber equalizes into the small volume of the piston chamber 54, thus producing a high emergency pressure in chamber 54 and consequently in the brake cylinder 58.

In emergency position of the automatic brake valve device, the feed valve passage 194 is connected through a cavity 250 in the rotary valve 178 to the application and release passage 122 as indicated in Fig. 10, so that when effecting an emergency application of the brakes, fluid at the pressure supplied by the feed valve device 4 is supplied to the application and release passage and pipe 122 leading to the distributing valve device, and from thence through passages 211 and 251 to chamber 145 in the independent release valve device, then past the cut-off valve 121 to chamber 124 and from thence through passage 131 to the application piston chamber 54 which at this time is connected to the equalizing valve chamber 13 and pressure chamber 22.

The supplying of fluid under pressure from the feed valve device 4 to the application piston chamber 54 and pressure chamber 22, in effecting an emergency application of the brakes, is adapted to maintain the pressure in said chambers in case there is leakage of fluid under pressure from said chambers.

The pressure obtained in the application piston chamber 54 by equalization of fluid under pressure from the pressure chamber 22 and by the maintaining supply of fluid under pressure from the brake valve device normally exceeds the setting of the safety valve device 151. In emergency position of the main slide valve 14, the safety valve device 151 is connected to the equalizing slide valve chamber 13 through passage 152 and choke 249 which is uncovered by the end of the slide valve 14, so that when the pressure exceeds the setting of the safety valve device, the safety valve device will operate to vent fluid under pressure from the equalizing valve chamber 13 and the connected pressure chamber 22 and application piston chamber 54. The choke 249 is adapted however to so restrict the supply of fluid under pressure to the safety valve device as compared to the rate of supply of fluid under pressure from the feed valve device through the automatic brake valve device 2 to the above mentioned chambers, that a balance of pressures is obtained in said chambers which exceeds the adjustment of the safety valve device, but which provides the high emergency brake cylinder pressure.

It will be evident that since the pressure in the pressure chamber varies according to the degree of pressure normally carried in the brake pipe, the degree of pressure at which the pressure chamber equalizes into the application piston chamber also varies with the normal brake pipe pressure. Consequently, since with our invention, the pressure in the application piston chamber and in the pressure chamber is maintained by flow from the same feed valve device which supplies fluid to maintain the brake pipe pressure, the balanced pressure obtained in the application piston chamber and in the pressure chamber varies as the setting of the feed valve device 4 or in other words, as the brake pipe pressure carried. The brake cylinder pressure obtained on cars in a train varies as the brake pipe pressure carried, and it is equally as important that the same variation in brake cylinder pressure be obtained on a locomotive, as above described, in order to provide uniform braking action on the locomotive and cars of a train.

In effecting an emergency application of the brakes, the movement of the slide valves 14 and 15 from release position to emergency position is rapid and although there might be a slight hesitation in said movement at the time the main slide valve 14 is engaged by shoulder 24 on the piston stem, there will be no appreciable flow of fluid to the reduction reservoir, but it is not necessary that the reduction reservoir function in effecting an emergency application of the brakes, as is the case when a service application of the brakes is effected.

In emergency position of the main slide valve it will be noted that fluid under pressure may also flow from valve chamber 13 through the service port 234 to the application piston chamber passage 205 at the same time as through the emergency port 248, this being on account of the service port still registering with the extension cavity 253 of the passage 205, and the reason for this will be hereinafter described.

In effecting an emergency application of the brakes, fluid under pressure is vented from the equalizing reservoir 185 and equalizing discharge valve piston chamber 184 through passage 201 in the automatic brake valve device 2, cavity 247 in the rotary valve 178 and atmospheric passage 218 at the same time as fluid under pressure is vented from the brake pipe, in the usual manner.

In order to effect a release of the locomotive brakes after an emergency application, the automatic brake valve device 2 is turned to running position, or first to release position and then after a certain lapse of time to running position, for charging the brake pipe 12, equalizing discharge valve piston chambers 187 and 184 and the equalizing reservoir 185 to the pressure supplied by the feed valve device 4 in the same manner as when releasing the brakes after a service application. The distributing valve device responds to the increase in brake pipe pressure in the equalizing piston chamber 11 and charges the pressure chamber 22 to brake pipe pressure, opens the reduction reservoir 119 and application chamber 219 to the atmosphere, and vents fluid under pressure from the application piston chamber 54, which permits the application portion of the distributing valve device to operate and vent fluid under pressure from the brake cylinder 58 so as to effect a release of the locomotive brakes in the same manner as hereinbefore described.

It is possible in effecting either a service or an emergency application of the brakes, that the main slide valve 14 may stick and a greater than normal pressure differential will be necessary on the equalizing piston 10 to start the movement of said slide valve with the result that when the slide valve finally moves, the excess of pressure differential acting on the piston will, in effecting a service application of the brakes, pull or cause the main slide valve 14 to jump to a position slightly beyond the normal service position shown in Fig. 5, but at the same time slightly to the rear of the emergency position shown in Fig. 6, while in the case of an emergency application of the brakes, the slide valve 14 may overtravel or jump to a position beyond the normal emergency position shown in Fig. 6. Such overtravel of the main slide valve 14 will not interfere in effecting either a service or an emergency application of the brakes however, for reasons which will now be described.

As hereinbefore described, it will be noted that passage 205 leading to the application piston chamber 54 terminates in a cavity 253 in the seating face of the main slide valve, and in the normal service position, shown in Fig. 5, the service port 234 is in full registry with said cavity. Full registration of port 234 with cavity 253 is then maintained even beyond the normal emergency position shown in Fig. 6. Cavity 208 in the seating face of the main slide valve maintains communication from the application piston chamber 54 to the application chamber 219 until the emergency port 248 starts to register with the application piston chamber passage 205, and the safety valve passage 152 is provided with a cavity extension in the seat of the main slide valve for maintaining communication from the application piston chamber 54 to the safety valve device 151 up to the time the choke 249, which opens into passage 152, is uncovered by the end of the main slide valve. It will now be evident that although, in effecting a service application of the brakes, the main slide valve 14 may be moved beyond the normal service position shown in Fig. 5, a service application of the brakes will be effected the same as if the slide valve had stopped in service position, but just as soon as emergency position is reached, the application chamber passage 220 is lapped so as to prevent flow of fluid under pressure to the application chamber in emergency position.

It will be evident from Fig. 6 that the emergency communications through the main slide valve 14 will be maintained the same even though the main slide valve 14 should jump forward into engagement with shoulder 23 on the piston stem 16 when the piston 10 is in emergency position engaging gasket 35.

If it is desired to apply the locomotive brakes independently of the train brakes when the train brakes are released and the automatic brake valve device and equalizing portion of the distributing valve device are in release position as shown in Figs. 1 and 2, the independent brake valve device 3 may be turned to either quick application position or slow application position according to how fast it is desired to apply the locomotive brakes.

In quick application position of the independent brake valve device, fluid at the pressure supplied by the reducing valve device 5 to rotary valve chamber 310 flows from said chamber through a port 254 to passage 212, as indicated in Fig. 11, and from thence through the application and release pipe 122 to the distributing valve device, then through passage 211 in the distributing valve device, past a check valve 255 to passage 209 leading to the seat of the main slide valve 14. From passage 209, fluid under pressure flows through cavity 208 in slide valve 14 to passage 220 leading to the application chamber 219 and also from cavity 208 through port 207 and cavity 206 in said slide valve to passage 205 through which fluid under pressure is supplied to passage 131 leading to the application piston chamber 54. Fluid under pressure is thus simultaneously supplied to the application chamber 219 and application piston chamber 54 and operates the application portion of the distributing valve device to supply fluid under pressure to the brake cylinder 58 in the same manner as hereinbefore described and at a rate governed by the rate at which fluid under pressure is supplied to the application piston chamber 54.

If it is desired to limit the degree of pressure obtained in effecting an independent application of the locomotive brakes to less than the pressure supplied by the reducing valve device 5, then when the desired degree of application of brakes is obtained on the locomotive, the independent brake valve device is turned to lap position, in which position passage 212 is lapped so as to prevent further flow of fluid under pressure to the distributing valve device.

In the slow application position of the independent brake valve device, the locomotive brakes are applied in the same manner as in the quick application position except at a slower rate, the supply of fluid at reducing valve pressure to the distributing valve device occurring through port 257 in the rotary valve 190, and a restricted passage 258 opening into passage 212, as indicated in Fig. 11, through which passage 212 fluid under pressure is supplied to the distributing valve device, the same as when a quick application of the locomotive brakes is effected.

When it is desired to effect a release of the locomotive brakes by operation of the independent brake valve device, the brake valve device may be turned to running position, in which position, with the automatic brake valve device in running position and the equalizing slide valve 14 of the distributing valve device in release position, fluid under pressure is vented from the application piston chamber 54 and application chamber 219 to the atmosphere through the choke plug 210 and both of said brake valve devices, in the same manner as when releasing the locomotive brakes by operation of the automatic brake valve device after a service application.

In effecting a release of the locomotive brakes as just described, it will be noted that the check valve 255 prevents back flow from passage 209 to passage 211 so that the release of fluid from the application piston chamber 54 and application chamber 219 must occur through and therefore be controlled by the release choke 210.

It will be noted here that in effecting an application of the locomotive brakes by operation of the independent brake valve device, fluid under pressure supplied by said brake valve device to passage 211 in the distributing valve device may flow through the choke plug 210 to the application piston chamber 54 and application chamber 219 as well as past the check valve 255, but this flow through the choke plug 210 is merely incidental. The choke plug 210 is, as above described, provided to control the release of the locomotive brakes with the independent brake valve device in running position, and the check valve 255 operates in releasing the locomotive brakes to prevent back flow through the communication by way of which the brakes are applied.

It will also be noted that in effecting an independent application of the locomotive brakes, fluid under pressure supplied by the independent brake valve device to passage 211 in the distributing valve device may also flow from said passage through passage 251, chamber 145 in the independent release control valve device, past the cut-off valve 121 to chamber 124 and from thence through passage 131 to the application piston chamber 54, and from passage 131 through passage 205 and the equalizing slide valve 14 to the aplication chamber 219. The supplying of fluid under pressure to the application piston chamber and application chamber past the cut-off valve 121 is also merely incidental when an independent application of the brakes is effected in the manner hereinbefore described, in which case the equalizing slide valve 14 is in release position.

When the train brakes are applied and the equalizing slide valve 14 is in service or emergency position, said slide valve laps passage 209 through which an independent application of the locomotive brakes is effected by way of the check valve 255 and an independent release of the locomotive brakes is effected through the choke plug 210.

With the equalizing slide valve lapping passage 209, if it is desired to release an application of the locomotive brakes effected by a reduction in brake pipe pressure, the independent brake valve device is turned to release position in which fluid at reducing valve pressure is supplied from the rotary valve chamber 310 through a port 259 in the rotary valve 190 to passage 226, as indicated in Fig. 11, from thence through pipe 135 to the distributing valve device, and from pipe 135 through passage 134 to the independent release valve piston chamber 133.

Fluid thus supplied to piston chamber 133 moves piston 123 into sealing engagement with the gasket bead 148. This movement of piston 123 first unseats the valve 142 and then pin 147 engages the cut-off valve 121 so that further movement of said piston unseats said cut-off valve and establishes communication between chambers 124 and 145 so that fluid under pressure is permitted to flow from the application piston chamber 54 through passage 131, chambers 124 and 145, thence through passages 251 and 211, application and release pipe 122, passage 212 in the independent brake valve device, a cavity 260 in the rotary valve 190 and from thence to the atmosphere through passage 228, as indicated in Fig. 11. This venting of fluid under pressure from the application piston chamber 54 permits brake cylinder pressure acting in chambers 55 and 57 to move the application piston to release position for venting fluid under pressure from the brake cylinder 58 in the same manner as hereinbefore described.

If it is desired to apply the locomotive brakes by operation of the independent brake valve device when the passage 209 is lapped by the equalizing slide valve 14, the independent brake valve device is turned to either slow application position or quick application position, according to how fast it is desired to apply the brakes, and in either of these application positions fluid at reducing valve pressure is supplied from the rotary valve chamber 310 to the application and release pipe 122 leading to the distributing valve device. From pipe 122 fluid under pressure flows through passages 211 and 251 to the release control valve device, thence past the cut-off valve 121 to chamber 124 and from thence through passage 131 to the application piston chamber 54. The application piston 68 is then operated to supply fluid under pressure to the brake cylinder in the same manner as hereinbefore described.

It will now be evident that if the equalizing slide valve 14 is in release position an application of the locomotive brakes by operation of the independent brake valve device will be effected by way of the check valve 255 and a release of the locomotive brakes will be effected through the choke plug 210, while if the equalizing slide valve 14 is moved from release position so as to lap passage 209, an application of the locomotive brakes may be effected past the cut-off valve 121 and a release of the brakes may be effected by supplying fluid under pressure to operate the release piston 123 to unseat said cut-off valve. The rate of release of the locomotive brakes is adapted to be faster upon unseating of the cut-off valve 121 than when effected through the choke plug 210, so that even if the equalizing slide valve 14 is in release position and it is desirable to effect a release of the locomotive brakes, after an independent application, at a rate faster than permitted by choke plug 210, the independent brake valve device may be turned to release position, instead of to running position, and supply fluid under pressure to operate the release piston 123 to unseat the cut-off valve 121, the unseating of said cut-off valve opening a release communication around the release choke plug 210 of greater flow capacity than that of said choke plug.

After effecting a release of the locomotive brakes by the operation of the release piston 123 to unseat the cut-off valve 121, the independent brake valve device may be turned to running position, in which fluid under pressure is vented from the release piston chamber 133 through passage 134, pipe 135, passage 226 in the independent brake valve device, cavity 227 in the rotary valve 190 and through the atmospheric passage 228, and at the same time the application and release pipe 122 is connected to the atmosphere through the independent brake valve device and automatic brake valve device, if the latter is in running position, so as to maintain the locomotive brakes released and to also condition the brake equipment for automatic operation by variations in brake pipe pressure as hereinbefore described.

The chamber 136 at the right hand side of the independent release piston 123 is normally maintained vented through the atmospheric passage 137 so that in effecting an independent release of the locomotive brakes with the independent brake valve device in release position, only a small increase in pressure in chamber 133 is required to actuate the piston 123 to unseat the cut-off valve 121. The piston 123 moves into sealing engagement with the gasket rib 148 to prevent leakage of actuating fluid from chamber 133 to chamber 136 and from thence to the atmosphere through passage 137. The valve 142 associated with the release piston stem 138 is provided to prevent leakage from chamber 145 to the vented chamber 136 when the locomotive brakes are applied, but such leakage, which may occur upon the unseating of valve 142 in effecting an independent release of the brakes, does not interfere with the proper control of said release. When the release piston chamber 133 is vented through the independent brake valve device in running position, spring 146 acts to seat the valve 142 and move the cut-off valve operating pin 147 away from the cut-off valve 121 so as to ensure that the cut-off valve will be properly seated by the spring 129.

If the independent brake valve device is turned to lap position to limit the degree of the application of locomotive brakes, passage 226 is lapped by the rotary valve 190 so that if there should be any leakage of fluid under pressure to said passage and from thence to the independent release piston chamber 133 in the distributing valve device, such leakage may escape through the leakage groove 150 to chamber 136 and from thence to the atmosphere through passage 137, thereby preventing undesired operation of the release piston 123 to unseat the valve 142 which might permit fluid under pressure to leak from chamber 145 and the connected application piston chamber 54 to the vented chamber 136 and thus tend to effect an undesired release of the locomotive brakes.

If for any reason the application and release pipe 122 should become broken, it will be apparent that the engineer will be unable to effect an application of the brakes on the locomotive by operation of the independent brake valve device, but the distributing valve device will still function to apply and release the locomotive brakes in accordance with variations in brake pipe pressure, and the locomotive brakes may still be released by turning the independent brake valve device to release position and operating the release piston 123 to unseat the cut-off valve 121. The cut-off valve chamber 124 is in direct communication through passage 131 with the application piston chamber 54 and in order to ensure against leakage from said chamber to the atmosphere through the broken pipe 122 when an automatic application of the brakes is effected, the cut-off valve 121 is preferably rubber seated and the spring 129 is provided to urge the cut-off valve into engagement with the seat rib 128 with such a force as to effect a leak-proof seal.

As hereinbefore described in connection with effecting an application of the brakes, the application and release pipe 122 is charged with fluid under pressure from the brake cylinder 58 through passage 60, containing choke 300, past the check valve 241 and through cavity 243 in the "Live-Dead Eng" cover plate 172. If the pipe 122 should become broken, the flow of fluid under pressure from the brake cylinder through the choke 300 and cavity 243 becomes a continuous leak from the brake cylinder but is so limited in degree by the choke 300 as not to have any effect upon the application. The check valve 241 is provided to prevent fluid under pressure supplied to pipe 122, in effecting an application of the locomotive brakes by operation of the independent brake valve device, from flowing directly to the brake cylinder 58 instead of to the application piston chamber 54 for actuating the application portion of the distributing valve device to supply fluid under pressure to the brake cylinder, in the manner hereinbefore described.

If it is desired to haul a locomotive equipped with the equipment shown in Fig. 1, as a dead engine, the automatic and independent brake valve devices having the handles on are placed in the running position so as to vent the application and release pipe 122 to the atmosphere. The usual double heading cock 261 in the brake pipe branch 188 is turned from the normal open position shown at the left hand side of Fig. 1 to the closed position shown at the right hand side of Fig. 1, so that in initially charging the brake pipe, fluid at brake pipe pressure can not flow to the equalizing discharge valve piston chamber 187 and open the discharge valve 183 so as to vent fluid under pressure from the brake pipe to the atmosphere, and also the closing of the double heading cock prevents brake pipe pressure from acting on the seat of the rotary valve 178 and blowing said rotary valve from its seat in initially charging the brake pipe.

On the distributing valve device, the "Live-Dead Eng" cover plate 172 is turned from the position shown in Fig. 2 to the dead engine position shown in Fig. 8. In the dead engine position of said cover plate, passages 242 and 211 are disconnected from each other and both lapped, so that there can be no flow of fluid under pressure from the brake cylinder to the application and release pipe 122 and from thence to the atmosphere through the two brake valves having the handles in running position, when the brakes on the dead locomotive are applied by a reduction in brake pipe pressure as will be later described. Also, in the dead engine position of the cover plate 172, the cavity 243 connects a passage 264 to a passage 266, so that in charging the brake pipe on a train in which the dead engine is being hauled, fluid under pressure from the brake pipe is permitted to flow from chamber 51 within the strainer device through passage 266, choke 301, cavity 243 in cover plate 172, through passage 264, past check valve 267, through chamber 268 and passage 269 to chamber 71 in the supply valve device 66, and from thence through passage 87 and pipe 88 to the main reservoir 86. The equalizing portion of the distributing valve device operates to charge the pressure chamber 22 when the brake pipe is being charged and operates in accordance with variations in brake pipe pressure to control the operation of the locomotive brakes in the same manner as when controlled by the automatic brake valve device on the locomotive, it being noted in this case however, that since the main reservoir is charged from the brake pipe and only to brake pipe pressure, said main reservoir functions merely as an auxiliary reservoir functions on a car in a train.

The check valve 267 is provided in the communication through which the main reservoir is charged from the brake pipe to prevent back flow of fluid under pressure from the main reservoir to the brake pipe upon a reduction in brake pipe pressure. A spring 270 is provided to urge said check valve to its seat. The choke 301 is adapted to limit the draw of fluid under pressure from the brake pipe in charging the main reservoir on the dead locomotive. A main reservoir is very large relative to an auxiliary reservoir as employed on cars and unless the choke 301 were employed, the release of the brakes on a train, including a dead locomotive, would be unduly delayed.

Fig. 9 shows the cover plate 172 in plan. The plate is provided with a raised portion 302 containing the cavity 243, and is secured to the member 34 by means of two cap screws 303. The legend "Eng" is provided on the member 34 in raised letters, while the cover plate is provided on one side with the legend "Live" in raised letters and on the opposite side with the legend "Dead" in raised letters. In the position of cover plate 172 shown in Fig. 9, the legend "Live" is immediately over the legend "Eng" and reads "Live Eng". This position of the cover plate corresponds to the position shown in Fig. 2. If the engine is to be hauled dead in a train, the cover plate 172 is reversed from the position shown in Fig. 9 so that the legend "Dead" is over the legend "Eng" and reads "Dead Eng" and this latter position corresponds to that shown in Fig. 8.

In effecting a service application of the brakes on a long train, the rate of brake pipe reduction toward the rear end of the train is very slow due to back flow of fluid under pressure from the auxiliary reservoirs on the cars to the brake pipe. If a locomotive equipped with our improved brake equipment is being hauled dead in the rear portion of a long train or is being used as a pusher at the rear portion of the train, there will be some tendency for fluid under pressure to flow from the pressure chamber to the brake pipe through the feed groove 202. However, when the brake pipe pressure acting in piston chamber 11 becomes reduced sufficiently below the pressure in valve chamber 13 to move the equalizing piston 10 and auxiliary slide valve 15 towards service position, the feed groove 202 is initially closed as shown in Fig. 3 and then further movement to the position shown in Fig. 4 is opposed by the pressure of spring 28. In the position shown in Fig. 4, fluid under pressure is vented from valve chamber 13 to the reduction reservoir 119 and the consequent rate of reduction in valve chamber 13 may exceed the slow rate of reduction in brake pipe pressure to such an extent that a sufficient differential of pressures may be obtained on the equalizing piston 10 to move said piston toward release position. The force of the compressed spring 28 aids the differential of fluid pressures acting on piston 10 to move said piston toward release position, but this actuating force of spring 28 ceases to be effective when said piston and the auxiliary slide valve reach the position shown in Fig. 3. The fluid pressure differential acting on piston 10 is at this time insufficient by itself to move the auxiliary slide valve, so that when spring 28 becomes ineffective, the auxiliary slide valve stops moving so as to lap the reduction reservoir port 221 in the main slide valve 14. Upon a further reduction in brake pipe pressure, a further venting of fluid under pressure from the valve chamber 13 to the reduction reservoir may occur, but this action will continue only until operation of the cut-off valve device, after which, further reduction in brake pipe pressure will cause the equalizing piston 10 to move the slide valves 14 and 15 to service position and effect a service application of the locomotive brakes.

By employing the spring 28 to aid the differential of fluid pressures on the equalizing piston 10 to move said piston and the auxiliary slide valve 15 from the position shown in Fig. 4 to the position shown in Fig. 3, the full traverse to release position and consequent venting of fluid under pressure from the reduction reservoir is prevented. If it were not prevented, the alternate movement of the auxiliary slide valve from release position to the position shown in Fig. 4 and then back to release position, would reduce the pressure in valve chamber 13 and in the pressure chamber 22 in steps according to the reduction in brake pipe pressure with a consequent loss of fluid under pressure intended to apply the locomotive brakes, thus the locomotive brakes would not apply as desired.

From the above description it will be evident that the improved locomotive brake equipment will operate to effect a service application of the locomotive brakes and a release of the locomotive brakes in synchronism with the service application and release of brakes on a train, and in effecting an emergency application of the brakes on the locomotive, the improved brake equipment will operate to govern the degree of the emergency application in accordance with the degree of brake pipe pressure carried, as occurs on the cars of a train.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. In a fluid pressure brake, the combination with a brake pipe, of a reduction reservoir, a valve device subject to the opposing pressures of the brake pipe and a chamber and operated by variations in brake pipe pressure for controlling the brakes and operated upon a reduction in brake pipe pressure for venting fluid from said chamber to said reduction reservoir, and valve means operated upon a predetermined increase in fluid pressure in said reduction reservoir, for cutting off the further venting of fluid from said chamber to said reservoir to provide a uniform reduction in the pressure of fluid in said chamber regardless of the pressure to which said chamber is charged.

2. In a fluid pressure brake, the combination with a brake pipe, of a reduction reservoir, a valve device subject to the opposing pressures of the brake pipe and a chamber normally charged with fluid under pressure from the brake pipe and operated upon a reduction in brake pipe pressure for first supplying fluid under pressure from said chamber to said reservoir and then from said chamber to effect an application of the brakes, and valve means operated upon a predetermined increase in fluid pressure in said reservoir for preventing the further venting of fluid from said chamber to said reservoir to provide a uniform reduction in the pressure of fluid in said chamber regardless of the pressure to which the chamber is charged.

3. In a fluid pressure brake, the combination with a brake pipe and a chamber normally charged with fluid under pressure from said brake pipe, of valve means controlled by the opposing pressures of said brake pipe and chamber and movable upon a reduction in brake pipe pressure to an application position for supplying fluid under pressure from said chamber for effecting an application of the brakes, and means operative upon the initiation of the reduction in brake pipe pressure and in advance of the movement of said valve means to application position for effecting a predetermined uniform reduction in pressure in said chamber regardless of the pressure to which said chamber is normally charged.

4. In a fluid pressure brake, the combination with a brake pipe and a chamber normally charged with fluid at the pressure carried in the brake pipe, of valve means movable upon a reduction in brake pipe pressure to a position for supplying fluid under pressure from said chamber for effecting an application of the brakes, and means for delaying the movement of said valve means to said position until after the brake pipe pressure has been reduced a predetermined uniform degree regardless of the pressure to which the brake pipe is initially charged.

5. In a fluid pressure brake, the combination with a brake pipe, of valve means subject to the opposing pressures of the brake pipe and a chamber and movable upon a reduction in brake pipe pressure to an application position for supplying fluid under pressure from said chamber to effect an application of the brakes, and means operative upon the preliminary movement of said valve means toward application position for effecting a predetermined uniform reduction in pressure in said chamber regardless of the pressure to which said chamber is initially charged.

6. In a fluid pressure brake, the combination with a brake pipe, a chamber normally charged with fluid at brake pipe pressure, and valve means movable upon a reduction in brake pipe pressure to an application position for supplying fluid under pressure from said chamber to effect an application of the brakes, and means operative upon the preliminary movement of said valve means toward application position for effecting a predetermined uniform reduction in pressure in said chamber regardless of the pressure to which said chamber is normally charged.

7. In a fluid pressure brake, the combination with a brake pipe, of valve means subject to the opposing pressures of the brake pipe and a chamber normally charged with fluid under pressure from the brake pipe, said valve means being movable upon a reduction in brake pipe pressure to an application position for supplying fluid under pressure from said chamber for effecting an application of the brakes, and means operative upon the preliminary movement of said valve means toward application position for effecting a fixed uniform reduction in pressure in said chamber regardless of the pressure to which said chamber is normally charged.

8. In a fluid pressure brake, the combination with a brake pipe, of valve means subject to the opposing pressures of the brake pipe and a chamber and movable upon a reduction in brake pipe pressure to an application position for supplying fluid under pressure from said chamber to effect an application of the brakes, a reduction reservoir, means operative upon the preliminary movement of said valve means toward application position for venting fluid under pressure from said chamber to said reservoir to effect a reduction in the pressure of fluid in the chamber, and valve means for limiting the amount of venting of fluid under pressure from said chamber to said reduction reservoir to provide a uniform reduction in the pressure of fluid in said chamber regardless of the pressure of fluid carried in the chamber.

9. In a fluid pressure brake, the combination with a brake pipe, of valve means subject to the opposing pressures of the brake pipe and a chamber and movable upon a reduction in brake pipe pressure to an application position for supplying fluid under pressure from said chamber to effect an application of the brakes, a reduction reservoir, means operative upon the preliminary movement of said valve means toward application position for venting fluid under pressure from said chamber to said reservoir to effect a reduction in the pressure of fluid in the chamber, and means for limiting the reduction in pressure in said chamber, to a uniform amount regardless of the pressure of fluid carried in the chamber, by flow to said reduction reservoir.

10. In a fluid pressure brake, the combination with a brake pipe, of valve means subject to the opposing pressures of the brake pipe and a chamber and movable upon a reduction in brake pipe pressure to an application position for supplying fluid under pressure from said chamber to effect an application of the brakes, a reduction reservoir, means operative upon the preliminary movement of said valve means toward application position for venting fluid under pressure from said chamber to said reservoir to effect a reduction in the pressure of fluid in the chamber, and means controlled by the build up of pressure in said reduction reservoir for closing communication through which fluid under pressure is vented from said pressure chamber to said reduction reservoir to limit the reduction in the pressure of fluid in the pressure chamber to a uniform amount regardless of the pressure of fluid carried in the pressure chamber.

11. In a fluid pressure brake, the combination with a brake pipe, of valve means subject to the opposing pressures of the brake pipe and a chamber and movable upon a reduction in brake pipe pressure to an application position for supplying fluid under pressure from said chamber to effect an application of the brakes, a reduction reservoir, means operative upon the preliminary movement of said valve means toward application position for venting fluid under pressure from said chamber to said reservoir to effect a reduction in the pressure of fluid in the chamber, and means operative upon a predetermined increase in pressure in said reduction reservoir for closing communication through which fluid under pressure is vented from said pressure chamber to said reduction reservoir to limit the reduction in the pressure of fluid in the pressure chamber to a uniform amount regardless of the pressure of fluid carried in the pressure chamber.

12. In a fluid pressure brake, the combination with a brake pipe and a chamber normally charged with fluid at brake pipe pressure, of a reduction reservoir, valve means operative upon a reduction in brake pipe pressure to vent fluid under pressure from said chamber to said reduction reservoir and also to supply fluid under pressure from said chamber for effecting an application of the brakes, and means operative upon a predetermined uniform reduction in pressure in said chamber regardless of the pressure in said chamber for closing communication through which fluid under pressure is vented from said chamber to said reduction reservoir.

13. In a fluid pressure brake, the combination with a brake pipe and a chamber normally charged with fluid at brake pipe pressure, of a reduction reservoir, valve means operative upon a reduction in brake pipe pressure to vent fluid under pressure from said chamber to said reduction reservoir to effect a reduction in the pressure of fluid in the chamber and also to supply fluid under pressure from said chamber for effecting an application of the brakes, and means controlled by the pressure of fluid in said reduction reservoir and operative to close the communication through which fluid under pressure is vented from said chamber to said reduction reservoir upon a predetermined increase in pressure in said reduction reservoir to limit the reduction in the pressure of fluid in said chamber to a uniform amount regardless of the pressure carried in the chamber.

14. In a fluid pressure brake, the combination with a brake pipe, a chamber normally charged with fluid under pressure from said brake pipe, and a reduction reservoir, of valve means subject to the opposing pressures of said brake pipe and chamber and operative upon a reduction in brake pipe pressure to supply fluid under pressure from said chamber for effecting an application of the brakes and also operative to establish a communication through which fluid under pressure is vented from said chamber to said reduction reservoir to effect a reduction in the pressure of fluid in the chamber, a movable abutment subject to the opposing pressures of said reduction reservoir and a spring and movable to a cut-out position upon a predetermined increase in pressure in said reduction reservoir, and a valve controlled by said abutment and operative upon movement of said abutment to cut-out position for closing said communication to limit the reduction in the pressure of fluid in said chamber to a uniform amount regardless of the pressure of fluid carried in the chamber.

15. In a fluid pressure brake, the combination with a brake pipe, a chamber normally charged with fluid under pressure from said brake pipe, and a reduction reservoir, of valve means subject to the opposing pressures of said brake pipe and chamber and operative upon a reduction in brake pipe pressure to supply fluid under pressure from said chamber for effecting an application of the brakes and also operative to establish a communication through which fluid under pressure is vented from said chamber to said reduction reservoir, a piston having a chamber at one side open to said reduction reservoir and a chamber at the opposite side open to the atmosphere means in the first mentioned chamber for effecting a leak-proof seal with said piston, a spring in the atmospheric chamber for moving said piston into engagement with the sealing means, thereby forming a chamber outside of said sealing means, means for permitting leakage from the reduction reservoir to the last mentioned chamber to escape to said atmospheric chamber, a valve in said communication normally operative by said piston to open said communication, said piston being movable, upon a predetermined increase in pressure acting on the area within said sealing means, to a cut-out position, and means for operating said valve to close communication from said chamber to said reduction reservoir upon movement of said piston to cut-out position.

16. In a fluid pressure brake, the combination with a brake pipe, a chamber and a reduction reservoir, of valve means having a release position for supplying fluid under pressure from said brake pipe to said chamber and for venting fluid from said reduction reservoir, and movable upon a reduction in brake pipe pressure to an application position for establishing a communication through which fluid under pressure is supplied from said chamber for effecting an application of the brakes, said valve means being operative in its traverse to application position to establish a communication through which fluid under pressure is vented from said chamber to said reduction reservoir, said reduction reservoir being bottled up in the application position of said valve means.

17. In a fluid pressure brake, the combination with a brake pipe, a source of fluid at the pressure normally carried in said brake pipe, and a chamber, of valve means operative upon a reduction in brake pipe pressure to supply fluid under pressure to said chamber for effecting an application of the brakes, and a brake valve device operative to effect a reduction in pressure in said brake pipe, and also to supply fluid under pressure from said source to said chamber.

18. In a fluid pressure brake, the combination with a brake pipe, a source of fluid at the pressure normally carried in said brake pipe, and a chamber, of valve means operative upon a reduction in brake pipe pressure to supply fluid under pressure to said chamber for effecting an application of the brakes, means for effecting a venting of fluid under pressure from said chamber at a restricted rate, and a brake valve device operative to effect a reduction in brake pipe pressure and at the same time to supply fluid under pressure from said source to said chamber for maintaining the pressure in said chamber against the venting of fluid under pressure from said chamber at the restricted rate.

19. In a fluid pressure brake, the combination with a brake pipe and a feed valve device operative to supply fluid under pressure to the brake pipe at the pressure normally carried in said brake pipe, of a brake valve device having one position for establishing communication through which said feed valve device supplies fluid under pressure to the brake pipe, and another position for establishing communication through which fluid under pressure is vented from said brake pipe, a chamber, valve means operative upon a reduction in brake pipe pressure for supplying fluid under pressure to said chamber for effecting an application of the brakes, and for establishing a communication with said chamber through which fluid under pressure is adapted to be vented from said chamber at a restricted rate, said brake valve device being adapted in the second mentioned position to establish a communication through which fluid under pressure is supplied by said feed valve device to said chamber.

20. In a fluid pressure brake, the combination with a brake pipe and a feed valve device, of a brake valve device for supplying fluid under pressure from said feed valve device to said brake pipe and movable to a service position for effecting a service reduction in brake pipe pressure and to an emergency position for effecting an emergency reduction in brake pipe pressure, a chamber, variation in pressure in which is adapted to control the brakes, valve means operated upon a service reduction in brake pipe pressure for supplying fluid under pressure to said chamber, and a safety valve device adapted to be connected to said chamber for limiting the pressure of fluid obtained in said chamber, said valve means being operative upon an emergency reduction in brake pipe pressure to supply fluid under pressure to said chamber at an emergency rate and to establish a restricted communication from said chamber to said safety valve device, said brake valve device being operative in emergency position to supply fluid under pressure from said feed valve device to said chamber at a restricted rate for maintaining the pressure in said chamber against the venting of fluid therefrom by operation of said safety valve device.

21. In a fluid pressure brake, the combination with a brake pipe and a chamber, of a piston subject to the opposing pressures of said brake pipe and chamber and movable upon a reduction in brake pipe pressure to an application position and upon a certain rate of increase in brake pipe pressure to a release position for supplying fluid under pressure from said brake pipe to said chamber at a certain rate, and movable upon a faster rate of increase in brake pipe pressure to an inner position for supplying fluid under pressure from said brake pipe to said chamber at a different rate, a stem carried by said piston, a main slide valve loosely mounted in said stem, an auxiliary slide valve mounted in said stem on said main slide valve and movable relative to said main slide valve, said slide valves being movable by said piston to said application position for establishing a plurality of communications through which the application of brakes is controlled, and to said release position and said inner position for establishing communications through which the release of brakes is controlled, and pressure exerting means for moving said piston and auxiliary slide valve relative to said main slide valve from said inner position to said release position upon substantial equalization of pressures in said brake pipe and chamber, the communications established by said slide valves being the same in said release and inner positions and also upon movement of said auxiliary slide valve relative to said main slide valve to release position.

22. In a fluid pressure brake, the combination with a brake pipe, a pressure chamber charged with fluid under pressure, and a reduction reservoir, of a valve device subject to the opposing pressures of said brake pipe and pressure chamber and having a release position for effecting a release of brakes, said valve device being movable by the pressure of fluid in said chamber upon a reduction in brake pipe pressure to an application position for effecting an application of the brakes and operative in its traverse from release position to application position to establish a communication through which fluid under pressure is vented from said pressure chamber to said reduction reservoir for delaying the movement of said valve device to application position, said valve device having a lap position, intermediate release position and the position in which said communication is open, for lapping said communication, and means for defining the lap position and rendered operative, upon movement of said valve device to the position for opening said communication, to move said valve device back only to said lap position if the pressure in said pressure chamber reduces to said reduction reservoir at a rate exceeding the rate of reduction in brake pipe pressure.

23. In a fluid pressure brake, the combination with a brake pipe and a pressure chamber, of a main slide valve, an auxiliary slide valve cooperative with and movable relative to said main slide valve, said slide valves having a release position for effecting a release of the brakes and an application position for effecting an application of the brakes, a piston subject to the opposing pressures of said chamber and the brake pipe and operative by the pressure of fluid in said pressure chamber upon a reduction in brake pipe pressure to move said slide valves from release position to application position, said auxiliary slide valve being movable relative to said main slide valve in release position of said main slide valve to a preliminary reduction position for venting fluid under pressure from said pressure chamber for delaying the operation of said piston to move said slide valves to application position, spring means for moving said piston and auxiliary slide valve from said preliminary reduction position towards release position for lapping the communication through which fluid under pressure is vented from said chamber if the rate of reduction in pressure in said pressure chamber exceeds the rate of reduction in brake pipe pressure, and means for rendering said spring means ineffective upon lapping said communication.

24. In a fluid pressure brake, the combination with a brake pipe, a pressure chamber normally charged with fluid under pressure, and a reduction reservoir, of a main slide valve having a release position for effecting a release of the brakes and an application position for effecting an application of the brakes, an auxiliary slide valve cooperative with said main slide valve in release position to vent said reduction reservoir, and movable relative to said main slide valve to a preliminary reduction position for venting fluid under pressure from said pressure chamber to said reduction reservoir, said auxiliary slide valve having a position intermediate release position and said preliminary reduction position for lapping the communication to said reduction reservoir, a piston subject to the opposing pressures of the brake pipe and said chamber for moving said slide valves and pressure exerting means operative upon said piston in moving said auxiliary slide valve between the lapping position and the preliminary reduction position, upon a reduction in brake pipe pressure, for operating said piston to move said auxiliary slide valve back to said lapping position if the rate of reduction in pressure in said pressure chamber exceeds the rate of reduction in brake pipe pressure.

25. In a fluid pressure brake, the combination with a brake pipe, a pressure chamber normally charged with fluid under pressure, and a reduction reservoir, of a main slide valve having a release position for effecting a release of the brakes and an application position for effecting an application of the brakes, an auxiliary slide valve cooperative with said main slide valve in release position to vent said reduction reservoir, and movable relative to said main slide valve to a preliminary reduction position for venting fluid under pressure from said pressure chamber to said reduction reservoir, said auxiliary slide valve having a position intermediate release position and said preliminary reduction position for lapping the communication to said reduction reservoir, a piston subject to the opposing pressures of the brake pipe and said chamber for moving said slide valves, and pressure exerting means operative upon said main slide valve in moving said auxiliary slide valve between the lapping position and preliminary reduction position, upon a reduction in brake pipe pressure, for operating said piston to move said auxiliary slide valve back to said lapping position if the rate of reduction in pressure in said pressure chamber exceeds the rate of brake pipe reduction.

26. In a fluid pressure brake, the combination with a brake pipe, a pressure chamber normally charged with fluid under pressure, and a reduction reservoir, of a main slide valve having a release position for effecting a release of the brakes and an application position for effecting an application of the brakes, an auxiliary slide valve cooperative with said main slide valve in release position to vent said reduction reservoir, and movable relative to said main slide valve to a preliminary reduction position for venting fluid under pressure from said pressure chamber to said reduction reservoir, said auxiliary slide valve having a position intermediate release position and said preliminary reduction position for lapping the communication to said reduction reservoir, a piston subject to the opposing pressures of the brake pipe and said chamber for moving said slide valves, a stem carried by said piston for moving said slide valves and having a lost movement relative to said main slide valve, and pressure exerting means carried by said piston stem and operative upon said main slide valve in moving the auxiliary slide valve between the lapping position and the preliminary reduction position, upon a reduction in brake pipe pressure, for operating said piston to move said auxiliary slide valve back to said lapping position if the rate of reduction in pressure in said pressure chamber exceeds the rate of brake pipe reduction.

27. In a fluid pressure brake, the combination with a brake pipe, of a brake controlling valve device comprising a casing, a piston mounted in said casing and subject to brake pipe pressure and having a piston stem, valve means operated by engagement with said stem, a rearward extension carried by said stem, said stem having an open ended chamber, an apertured plug closing the open end of said chamber, a movable open ended plunger mounted in said chamber and adapted to engage one of said slide valves and slidably extending through the aperture in said plug, a spring surrounding said plunger and operative upon said plunger to oppose movement of said stem relative to one of said slide valves, a plug closing the open end of said plunger, another plunger extending through an opening in the opposite end of the first mentioned plunger and adapted to engage the casing, and a spring interposed between the second mentioned plug and the second mentioned plunger.

28. In a fluid pressure brake, the combination with a brake pipe, of a brake controlling valve device having a chamber to which fluid under pressure is supplied from said brake pipe, and a strainer device, interposed in the communication through which fluid under pressure is supplied to said chamber, for removing foreign matter from the fluid pressure stream, said strainer device comprising a casing having an open ended chamber, a cover plate closing the open end of said chamber, a gasket interposed between said casing and cover plate for preventing leakage of fluid under pressure from said chamber, a container open at each end and packed with a straining material and mounted between the closed end of said chamber and said cover plate, means carried by the casing for compressing the straining material in one end of said container, and means carried by said gasket for compressing the straining material in the other end of said container.

29. In a fluid pressure brake, the combination with a brake pipe, of a brake controlling valve device having a chamber to which fluid under pressure is supplied from said brake pipe, and a strainer device interposed in the communication through which fluid under pressure is supplied to said chamber for removing foreign matter from the fluid pressure stream, said strainer device comprising a casing having an open ended chamber, a cover plate closing the open end of said chamber, a gasket interposed between said casing and cover plate for preventing leakage of fluid under pressure from said chamber, two spaced, concentrically arranged, perforated cylinders having straining material packed in the space between said cylinders and mounted longitudinally between the closed end of said chamber and said cover plate, an annular rib on the casing interposed between said cylinders at one end for compressing the straining material adjacent said end, and an annular rib on said gasket interposed between said cylinders at the opposite end for compressing the straining material adjacent said opposite end, said cylinders defining two chambers separated by said straining material, one of the two chambers being connected to said brake pipe and the other of said two chambers being connected to the first mentioned chamber.

30. In a fluid pressure brake, the combination with a brake pipe, a brake cylinder, and a main reservoir, of a brake controlling valve device having a control chamber open to said brake pipe, said brake controlling valve device being operative upon a reduction in pressure in said chamber to supply fluid under pressure from said main reservoir to said brake cylinder to effect an application of the brakes and operative upon an increase in pressure in said chamber to vent fluid under pressure from said brake cylinder to effect a release of the brakes, said brake controlling valve device having a one way flow communication independent of said chamber through which fluid under pressure is adapted to flow directly from said brake pipe to said main reservoir, and a strainer device for filtering fluid under pressure supplied from said brake pipe to said chamber and to said communication.

31. In a fluid pressure brake, the combination with a brake pipe, a brake cylinder, and a main reservoir, of a brake controlling valve device having a control chamber open to said brake pipe and operative upon a reduction in pressure in said chamber to supply fluid under pressure from said main reservoir to said brake cylinder to effect an application of the brakes and operative upon an increase in pressure in said chamber to vent fluid under pressure from said brake cylinder to effect a release of the brakes, said brake controlling valve device having a passage through which fluid under pressure can flow from the brake pipe only to said main reservoir, and means for closing communication through said passage.

32. In a fluid pressure brake, the combination with a brake pipe, a brake cylinder, and a main reservoir, of a brake controlling valve device operative upon a reduction in brake pipe pressure to supply fluid under pressure from said main reservoir to said brake cylinder to effect an application of the brakes and operative upon an increase in brake pipe pressure to vent fluid under pressure from said brake cylinder to effect a release of the brakes, said brake controlling valve device having a restricted communication through which fluid under pressure is adapted to be supplied from said brake pipe to said main reservoir, a check valve in said communication for preventing flow of fluid under pressure from said main reservoir to said brake pipe, and means having one position in which said communication is open and another position in which said communication is closed.

33. In a fluid pressure brake, the combination with a brake pipe, a brake cylinder, and a main reservoir, of a brake controlling valve device operative upon a reduction in brake pipe pressure to supply fluid under pressure from said main reservoir to said brake cylinder to effect an application of the brakes and operative upon an increase in brake pipe pressure to vent fluid under pressure from said brake cylinder to effect a release of the brakes, said brake controlling valve device having a restricted communication through which fluid under pressure is adapted to be supplied from said brake pipe to said main reservoir, a check valve in said communication for preventing flow of fluid under pressure from said main reservoir to said brake pipe, a plate removably secured to said brake controlling valve device and having a cavity through which said communication is established in one position of said plate, said plate having another position for closing said communication.

34. In a fluid pressure brake, the combination with a brake pipe, of an equalizing valve device controlled by variations in brake pipe pressure and having a release position, a brake valve device and a pipe connecting said brake valve device to said equalizing valve device, said brake valve device being operative to supply fluid under pressure through said pipe to effect an application of the brakes and to vent fluid under pressure from said pipe to effect a release of the brakes only when said equalizing valve device is in said release position.

35. In a fluid pressure brake, the combination with a brake pipe, of an equalizing valve device controlled by variations in brake pipe pressure and having a release position, a brake valve device, and a pipe connecting said brake valve device to said equalizing valve device, through which pipe said brake valve device is operative to control the application and release of brakes when said equalizing valve device is in release position, a choke for restricting the venting of fluid from said equalizing valve device to said pipe in effecting a release of the brakes, and a one way flow passage by-passing said choke through which passage fluid under pressure flows from said pipe in effecting an application of the brakes.

36. In a fluid pressure brake, the combination with a brake pipe, of an equalizing valve device controlled by variations in brake pipe pressure and having a release position, a brake valve device, and a pipe connecting said brake valve device to said equalizing valve device, through which pipe said brake valve device is operative to control the application and release of brakes when said equalizing valve device is in release position, a choke for restricting the venting of fluid from said equalizing valve device to said pipe in effecting a release of the brakes, a passage by-passing said choke, through which passage fluid under pressure flows from said pipe in effecting an application of the brakes, and a check valve in said passage for preventing back flow, said check valve operating upon a small differential of pressures.

37. In a fluid pressure brake, the combination with a brake pipe and valve means movable upon a reduction in brake pipe pressure to an application position for effecting an application of the brakes and movable upon an increase in brake pipe pressure to a release position for establishing a communication through which fluid under pressure is vented to effect a release of the brakes, a brake valve device, a pipe connecting said communication to said brake valve device, said brake valve device being operative in one position to vent said pipe and in another position to supply fluid under pressure through said pipe to said communication for effecting an application of the brakes when said valve means is in release position, another pipe connected to said brake valve device, and means operated by fluid under pressure supplied through the last mentioned pipe for releasing fluid under pressure through the first mentioned pipe when said equalizing valve device is in application position.

38. In a fluid pressure brake, the combination with a brake pipe and valve means movable upon a reduction in brake pipe pressure to an application position for effecting an application of the brakes and movable upon an increase in brake pipe pressure to a release position for establishing a communication through which fluid is vented to effect a release of the brakes, a brake valve device, a pipe connecting said communication to said brake valve device, said brake valve device being operative in one position to vent said pipe and in another position to supply fluid under pressure through said pipe to said communication for effecting an application of the brakes when said valve means is in release position, a by-pass around said communication through which fluid under pressure is adapted to flow from said pipe for effecting an application of the brakes when said valve means is in application position, a check valve in said by-pass for normally preventing back flow of fluid under pressure through said by-pass to said pipe, means operated by fluid under pressure for unseating said check valve to permit back flow of fluid under pressure to said pipe to effect a release of the brakes, and a release pipe connecting said brake valve device to said means, said brake valve device having a position for venting the first mentioned pipe and at the same time supplying fluid under pressure to said release pipe.

39. In a fluid pressure brake, the combination with a brake pipe and valve means movable upon a reduction in brake pipe pressure to an application position for effecting an application of the brakes and movable upon an increase in brake pipe pressure to a release position for establishing a communication through which fluid under pressure is vented to effect a release of the brakes, a brake valve device, a pipe connecting said communication to said brake valve device, said brake valve device being operative in one position to vent said pipe and in another position to supply fluid under pressure through said pipe to said communication for effecting an application of the brakes when said valve means is in release position, a choke for restricting the venting of fluid under pressure through said communication to said pipe, an unrestricted by-pass around said choke for permitting rapid flow of fluid under pressure from said pipe in effecting an application of the brakes, a check valve in said by-pass for preventing back flow of fluid under pressure through said by-pass and operative upon a small differential of pressures for permitting the pressure on one side to increase to substantially the supply pressure on the seating side, an unrestricted by-pass around said choke and the communication through said valve means, through which by-pass fluid under pressure is adapted to be supplied from said pipe, independently of said valve means, for effecting an application of the brakes, and through which fluid under pressure is adapted to be vented by operation of said brake valve device and independently of said valve means, for effecting a release of the brakes, a check valve in said unrestricted by-pass normally operative to prevent back flow, means for effecting leak-proof seating of the last mentioned check valve, means operative to unseat the last mentioned check valve, and another pipe connecting said brake valve device to said means, said brake valve device being operative in a certain position to supply fluid under pressure to the last mentioned pipe for effecting the operation of said means and for at the same time venting the first mentioned pipe.

40. In a fluid pressure brake, the combination with a brake pipe and a brake cylinder, of a valve device operated upon an increase in fluid pressure for supplying fluid under pressure to the brake cylinder, a pipe through which fluid under pressure is released from said valve device, a passage through which fluid under pressure is supplied from said brake cylinder to said pipe, means for closing communication through said passage valve means operated upon an increase in brake pipe pressure for establishing communication from said valve device to said pipe and a brake valve device for increasing the brake pipe pressure and for venting said pipe.

41. In a fluid pressure brake, the combination with a brake pipe, a brake cylinder, and a main reservoir, of a valve device operated upon an increase in fluid pressure for supplying fluid under pressure from said main reservoir to said brake cylinder, a pipe through which fluid under pressure is vented from said valve device, a passage connecting said brake cylinder to said pipe, a check valve for preventing flow of fluid under pressure from said pipe to said brake cylinder, valve means operated upon a reduction in brake pipe pressure to supply fluid under pressure for operating said valve device and operated upon an increase in brake pipe pressure to establish the communication from said valve device to said pipe, a brake valve device for varying the brake pipe pressure and having a position for venting said pipe, a passage connecting said brake pipe to said main reservoir, a check valve in the last mentioned passage for preventing flow of fluid from said main reservoir to said brake pipe, and means for controlling both of said passages and operative to close communication through one of said passages when communication through the other of said passages is open.

42. In a fluid pressure brake, the combination with a brake pipe and a brake cylinder, of a valve device operated upon an increase in fluid pressure to supply fluid under pressure to said brake cylinder and upon a reduction in fluid pressure to vent fluid under pressure from said brake cylinder, a pipe through which fluid under pressure is supplied to and released from said valve device, valve means operated upon a reduction in brake pipe pressure to close communication from said pipe to said valve device and supply fluid under pressure for operating said valve device and operated upon an increase in brake pipe pressure to open said communication, a passage connecting said brake cylinder to said pipe through which said pipe is adapted to be charged with fluid under pressure from said brake cylinder, a check valve for preventing flow of fluid under pressure through said pipe to said brake cylinder, and a brake valve device for controlling the release of fluid under pressure from said pipe.

43. In a fluid pressure brake, the combination with a valve device operated upon an increase in fluid pressure for effecting an application of the brakes and upon a reduction in fluid pressure for effecting a release of the brakes, a passage through which fluid under pressure is supplied to and vented from said valve device, a check valve for normally preventing back flow through said passage, a release pipe, and a piston subject to the opposing pressures of said release pipe and the atmosphere for unseating said check valve.

44. In a fluid pressure brake, the combination with a valve device operated upon an increase in fluid pressure for effecting an application of the brakes and upon a reduction in fluid pressure for effecting a release of the brakes, of a passage through which fluid under pressure is supplied to and vented from said valve device, a check valve for normally preventing back flow through said passage, a release pipe, a piston having at one side a chamber open to the atmosphere and operated by fluid under pressure from said release pipe acting on the opposite side for unseating said check valve, and a valve for preventing leakage from said passage to said atmospheric chamber.

45. In a fluid pressure brake, the combination with a valve device operated upon an increase in fluid pressure for effecting an application of the brakes and upon a reduction in fluid pressure for effecting a release of the brakes, a passage through which fluid under pressure is supplied to and vented from said valve device, a check valve for normally preventing back flow through said passage, a release pipe, a piston having at one side a chamber open to the atmosphere and movable by fluid under pressure from said release pipe acting on the opposite side, a stem carried by said piston and operative to unseat said check valve upon movement of said piston, a valve for preventing leakage from said passage past said stem, and a spring for moving said piston and stem away from said check valve upon the venting of said release pipe.

46. The combination with a fluid pressure pipe and a casing having a main chamber communicating with said pipe, said casing having an open ended cavity through which the communication is established, of a check valve arrangement contained in said cavity for controlling the flow of fluid under pressure from said pipe to said chamber and from said chamber to said pipe, said check valve arrangement comprising a gasket mounted in said cavity, a dividing member pressed into sealing engagement with said gasket and defining at one side a check valve chamber communicating with said main chamber and with said pipe, a check valve in said check valve chamber for closing communication from said check valve chamber to said pipe, said dividing member having at the opposite side a chamber communicating with said pipe and having an aperture through which communication is established between the chambers at the opposite sides thereof, a check valve in the chamber at said opposite side of said dividing member for closing communication through said aperture, and a retaining member secured to said casing in the open end of said cavity for pressing said dividing member into sealing engagement with said gasket.

47. The combination with a fluid pressure pipe and a casing having a main chamber communicating with said pipe, said casing having an open ended cavity through which the communication is established, of a check valve arrangement contained in said cavity for controlling the flow of fluid under pressure from said pipe to said chamber and from said chamber to said pipe, said check valve arrangement comprising a gasket mounted in said cavity, a dividing member pressed into sealing engagement with said gasket and defining at one side a check valve chamber communicating with said main chamber and with said pipe, a check valve in said check valve chamber for closing communication from said check valve chamber to said pipe, said dividing member having at the opposite side a chamber communicating with said pipe and having an aperture through which communication is established between the chambers at the opposite sides thereof, a check valve in the chamber at said opposite side of said dividing member for closing communication through said aperture, and a retaining member screwed into the open end of said cavity for pressing said dividing member into sealing engagement with said gasket.

48. In a fluid pressure brake, the combination with a chamber to which fluid under pressure is supplied to effect an application of the brakes and from which fluid under pressure is vented to effect a release of the brakes, a communication through which fluid under pressure is supplied to said chamber, a check valve in said communication for preventing back flow, a by-pass around said check valve through which fluid under pressure is released from said chamber, a choke plug in said by-pass for restricting the release of fluid under pressure from said chamber, a by-pass around said choke plug for effecting a release of fluid under pressure from said chamber at a faster rate, a check valve in the last mentioned by-pass for normally preventing release of fluid under pressure from said chamber, and means operated by fluid under pressure for unseating the last mentioned check valve.

49. In a fluid pressure brake, the combination with a brake pipe, a pressure chamber charged with fluid under pressure from said brake pipe, and a chamber to which fluid under pressure is supplied from said pressure chamber for effecting an application of the brakes, of a valve device subject to the opposing pressures of the brake pipe and a valve chamber open to said pressure chamber and containing a slide valve movable upon a reduction in brake pipe pressure to an application position for supplying fluid under pressure from said pressure chamber to the second mentioned chamber, and a safety valve device connected to a passage leading to the seat of said slide valve, said slide valve being operative in application position to open said passage directly to said valve chamber so that said safety valve device will operate to limit the pressure in said chambers.

50. In a fluid pressure brake, the combination with a valve device operated upon an increase in fluid pressure to effect an application of the brakes and upon a reduction in pressure to effect a release of the brakes, of an automatic brake valve device, an independent brake valve device and a pipe connecting said valve device to both of said brake valve devices, each of said brake valve devices being operative independently of the other to supply fluid under pressure to said pipe for operating said valve device to effect an application of the brakes and cooperative at one time to vent fluid under pressure from said pipe for effecting a reduction in pressure on said valve device, said independent brake valve device being operative at another time to vent said pipe directly to the atmosphere, independently of said automatic brake valve device, for also effecting a reduction in pressure on said valve device.

51. In a fluid pressure brake, the combination with a valve device operated upon an increase in fluid pressure to effect an application of the brakes and upon a reduction in pressure to effect a release of the brakes, of an automatic brake valve device, an independent brake valve device and a pipe connecting said valve device to both of said brake valve devices, each of said brake valve devices being operative independently of the other to supply fluid under pressure to said pipe for operating said valve device to effect an application of the brakes and cooperative at one time to vent fluid under pressure from said pipe for effecting a reduction in pressure on said valve device, means for restricting the venting of fluid under pressure from said valve device to said pipe, valve means for opening an unrestricted venting communication from said valve device to said pipe, said independent brake valve device being operative at another time to vent said pipe directly to the atmosphere and for at the same time effecting the operation of said valve means.

52. In a fluid pressure brake, the combination with a brake pipe, of an equalizing valve device operated by variations in brake pipe pressure for effecting an application and release of the brakes, an independent application and release pipe, and a brake valve device operative to supply fluid under pressure through said pipe to effect an application of the brakes and to release fluid from said pipe to effect the release of the brakes, said equalizing valve device controlling a communication through which said brake valve device supplies and releases fluid under pressure by way of said pipe and adapted to open said communication only in the release position of said equalizing valve device.

53. In a fluid pressure brake, the combination with a brake pipe, of an equalizing valve device operated by variations in brake pipe pressure for effecting an application and release of the brakes, a brake controlling valve device operated by an increase in fluid pressure for effecting an application of the brakes and by a reduction in fluid pressure for effecting the release of the brakes, an independent application and release pipe through which fluid under pressure is supplied to and released from said brake controlling valve device, and a brake valve device having an application position in which fluid under pressure is supplied to said pipe and a release position in which fluid under pressure is released from said pipe, communication from said brake controlling valve device to said pipe being opened in the release position of said equalizing valve device.

54. In a fluid pressure brake, the combination with a brake pipe and a chamber to which fluid under pressure is supplied to effect an application of the brakes and from which fluid under pressure is vented to effect a release of the brakes, of a pipe through which fluid under pressure is adapted to be supplied to and released from said chamber, a brake valve device for controlling the supply and release of fluid under pressure to and from said pipe, and an equalizing valve device having a normal position in which communication is established between said pipe and said chamber, said equalizing valve device being movable upon a reduction in brake pipe pressure to close said communication and to supply fluid under pressure to said chamber.

55. In a fluid pressure brake, the combination with a brake pipe and a chamber to which fluid under pressure is supplied to effect an application of the brakes and from which fluid under pressure is vented to effect a release of the brakes, of a pipe through which fluid under pressure is adapted to be supplied to and released from said chamber through two different communications, a brake valve device for controlling the supply and release of fluid under pressure to and from said pipe, an equalizing valve device for controlling one of said communications and having a normal position in which said equalizing valve device controlled communication is open, said equalizing valve device being movable upon a reduction in brake pipe pressure to close the equalizing valve device controlled communication and to supply fluid under pressure to said chamber, a check valve in the other of said communications normally preventing flow of fluid from said chamber to said pipe, and fluid pressure means operative to unseat said check valve to permit flow from said chamber to said pipe, said brake valve device having a position for varying the fluid pressure on and thereby effect the operation of said means and in the same position connect said pipe to the atmosphere.

56. In a fluid pressure brake, the combination with a brake pipe and a brake cylinder, of a valve device operative by fluid under pressure to supply fluid under pressure to said brake cylinder, a pipe through which fluid under pressure is released from said valve device to effect a release of fluid under pressure from said brake cylinder, a one way flow passage through which fluid under pressure is supplied from said brake cylinder to said pipe, valve means operative upon a reduction in brake pipe pressure to supply fluid under pressure to said valve device and to close communication from said valve device to said pipe and operative upon an increase in brake pipe pressure to cut off the supply of fluid under pressure to said valve device and to open said communication, a brake valve device having a position for opening said pipe to the atmosphere and for at the same time supplying fluid under pressure to said brake pipe, and a reversible cover plate secured to said valve device and having a cavity adapted in one position of said cover plate to establish communication through said passage and in another position to close communication through said passage.

57. In a fluid pressure brake equipment for a locomotive, the combination with a brake pipe, a brake cylinder, and a main reservoir, of valve means operative upon a reduction in brake pipe pressure to supply fluid under pressure from said main reservoir to said brake cylinder to effect an application of the brakes and operative upon an increase in brake pipe pressure to vent fluid under pressure from said brake cylinder to effect a release of the brakes, a one way flow passage for supplying fluid under pressure from said brake pipe to said main reservoir, and a removable cover plate secured to said valve means and normally closing communication through said passage, said cover being adapted to be turned to a position for opening said communication.

58. In a fluid pressure brake, the combination with a brake pipe, a pressure chamber and a reduction reservoir, of a slide valve operatively mounted in said chamber and having a release position for venting fluid under pressure from said reduction reservoir, a venting position for establishing a communication from said pressure chamber to said reduction reservoir, and an intermediate position between said release and venting positions for lapping said communication, a movable abutment subject to the opposing pressures of the brake pipe and pressure chamber and operative according to variations in said pressures to position said slide valve, and means operative to oppose the operation of said abutment to move said slide valve only from said intermediate position to said venting position.

59. In a fluid pressure brake, the combination with a brake pipe, a pressure chamber and a valve operatively mounted in said chamber and having a normal position and movable therefrom to a position for venting fluid under pressure from said chamber to effect a limited reduction in pressure therein and having a lap position intermediate the normal and venting positions for closing communication through which fluid under pressure is vented from said chamber, a movable abutment subject to the opposing pressures of said brake pipe and chamber for moving said valve to said positions, and means for defining said lap position and operative to oppose operation of said abutment to move said valve from said lap position to said venting position.

60. In a fluid pressure brake, the combination with a brake pipe, of a brake controlling valve device comprising a casing, a piston mounted in said casing and movable therein according to variations in brake pipe pressure, a stem carried by said piston and having a rearward extension, a plunger movably mounted in said extension, a spring in said extension acting on said plunger for opposing movement of said stem relative to said plunger, an element movably mounted in said plunger, and a spring carried by said plunger and acting on said element for opposing movement of said stem relative to said element.

61. In a fluid pressure brake, the combination with a brake pipe, of a casing having a supply chamber open to said brake pipe, a receiving chamber adapted to receive fluid under pressure from said supply chamber, a piston movably mounted in said supply chamber and separating said chambers, a gasket carried by said casing and engageable by the receiving chamber face of said piston in one position thereof for closing communication from the periphery of said piston to said receiving chamber, said piston having another position spaced from said gasket, a feed groove in said casing establishing communication around the periphery of said piston through which fluid under pressure is adapted to be supplied from said supply chamber to said receiving chamber, and a restricted communication around said gasket connected to said receiving chamber and leading to said feed groove whereby fluid under pressure is adapted to be supplied from said supply chamber to said receiving chamber through said feed groove and restricted communication, arranged in series, when said piston is in engagement with said gasket.

62. In a fluid pressure brake, the combination with a brake pipe, of a casing having a supply chamber open to said brake pipe, a receiving chamber adapted to receive fluid under pressure from said supply chamber, a piston movably mounted in said supply chamber and separating said chambers, a gasket carried by said casing and engageable by the receiving chamber face of said piston in one position thereof for closing communication from the periphery of said piston to said receiving chamber, said piston having another position spaced from said gasket, a feed groove in said casing establishing communication around the periphery of said piston through which fluid under pressure is adapted to be supplied from said supply chamber to said receiving chamber, a restricted communication around said gasket connected to said receiving chamber and leading to said feed groove whereby fluid under pressure is adapted to be supplied from said supply chamber to said receiving chamber through said feed groove and restricted communication, arranged in series, when said piston is in engagement with said gasket, and pressure exerting means for defining the position in which said piston is free of said gasket and operative to move said piston out of engagement with said gasket and to said position upon substantial equalization of pressures in said chambers.

63. In a fluid pressure brake, the combination with a brake pipe and a chamber normally charged with fluid under pressure from said brake pipe, of valve means controlled by the opposing pressures of said brake pipe and chamber and movable upon a reduction in brake pipe pressure to an application position for supplying fluid under pressure from said chamber for effecting an application of the brakes, and means operative upon the initiation of the reduction in brake pipe pressure and in advance of the movement of said valve means to application position for effecting a chosen reduction in pressure in said chamber of the same degree for any pressure to which the chamber is charged.

64. In a fluid pressure brake, the combination with a brake pipe and a chamber normally charged with fluid under pressure from said brake pipe, of valve means controlled by the opposing pressures of said brake pipe and chamber and movable upon a reduction in brake pipe pressure to an application position for supplying fluid under pressure from said chamber for effecting an application of the brakes, and means operative upon the initiation of the reduction in brake pipe pressure and in advance of the movement of said valve means to application position for effecting a chosen degree of reduction in pressure in said chamber which will not vary according to variations in the chamber pressure.

65. In a fluid pressure brake, the combination with a brake pipe and a chamber normally charged with fluid under pressure from said brake pipe, of valve means controlled by the opposing pressures of said brake pipe and chamber and movable upon a reduction in brake pipe pressure to an application position for supplying fluid under pressure from said chamber for effecting an application of the brakes, and means operative upon the initiation of the reduction in brake pipe pressure and in advance of the movement of said valve means to application position for effecting a chosen degree of reduction in pressure in said chamber, said degree of reduction being independent of the pressure to which said chamber is charged.

66. In a fluid pressure brake, the combination with a brake pipe and a chamber normally charged with fluid under pressure from said brake pipe, of valve means controlled by the opposing pressures of said brake pipe and chamber and movable upon a reduction in brake pipe pressure to an application position for supplying fluid under pressure from said chamber for effecting an application of the brakes, and means operative upon the initiation of the reduction in brake pipe pressure and in advance of the movement of said valve means to application position for effecting a chosen degree of reduction in pressure in said chamber, said degree of reduction being unaffected by the pressure to which said chamber is charged.

67. In a fluid pressure brake, the combination with a brake pipe, of a chamber normally charged with fluid under pressure, a valve device subject to the opposing pressures of the brake pipe and chamber and operated upon a reduction in brake pipe pressure for venting fluid under pressure from said chamber to effect a reduction in the pressure of fluid in the chamber and for supplying fluid to effect an application of the brakes, and valve means operative to limit the reduction in the pressure of fluid in said chamber to a uniform amount regardless of the pressure carried in said chamber.

68. In a fluid pressure brake, the combination with a brake pipe, of a chamber normally charged with fluid under pressure, a valve device subject to the opposing pressures of the brake pipe and chamber and operated upon a reduction in brake pipe pressure for venting fluid under pressure from said chamber to effect a reduction in the pressure of fluid in the chamber and for supplying fluid to effect an application of the brakes, a valve operative to cut off the flow of fluid from said chamber to limit the reduction in the pressure of fluid in the chamber to a uniform amount regardless of the pressure of fluid carried in said chamber, and pressure responsive means for controlling the operation of said valve.

CLYDE C. FARMER.
ELLIS E. HEWITT.